(12) United States Patent
Kreischer et al.

(10) Patent No.: US 8,049,052 B2
(45) Date of Patent: Nov. 1, 2011

(54) SYSTEM AND METHOD OF DEACTIVATING AND QUENCHING AN OLIGOMERIZATION CATALYST

(75) Inventors: Bruce E Kreischer, Kingwood, TX (US); Orson L Sydora, Houston, TX (US); Ronald D Knudsen, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 20 days.

(21) Appl. No.: 12/609,631

(22) Filed: Oct. 30, 2009

(65) Prior Publication Data

US 2010/0113851 A1 May 6, 2010

Related U.S. Application Data

(60) Provisional application No. 61/110,396, filed on Oct. 31, 2008, provisional application No. 61/110,407, filed on Oct. 31, 2008, provisional application No. 61/110,476, filed on Oct. 31, 2008.

(51) Int. Cl.
  *C07C 2/22* (2006.01)
(52) U.S. Cl. ........ 585/513; 585/502; 585/510; 585/511; 585/512; 585/520; 585/521; 585/522; 585/523; 585/903
(58) Field of Classification Search ................. 585/502, 585/510, 511, 512, 513, 903, 520, 521, 522, 585/523; 526/82, 84
See application file for complete search history.

(56) References Cited

U.S. PATENT DOCUMENTS

| | | | |
|---|---|---|---|
| 3,662,021 A | | 5/1972 | Langer |
| 4,409,414 A | * | 10/1983 | Langer, Jr. .................... 585/524 |
| 4,426,229 A | | 1/1984 | Bolton et al. |
| 4,486,615 A | | 12/1984 | Langer |
| 4,701,504 A | * | 10/1987 | Mitchell et al. ................. 526/83 |
| 5,563,312 A | | 10/1996 | Knudsen et al. |
| 5,689,028 A | * | 11/1997 | Lashier et al. ................ 585/512 |
| 5,731,381 A | | 3/1998 | Apecetche et al. |
| 5,750,816 A | | 5/1998 | Araki et al. |
| 5,856,612 A | | 1/1999 | Araki et al. |
| 5,910,619 A | | 6/1999 | Urata et al. |

(Continued)

FOREIGN PATENT DOCUMENTS

WO WO 0147839 A1 7/2001

OTHER PUBLICATIONS

D. R. Lide, ed., CRC Handbook of Chemistry and Physics, 91st edition, 2011 Internet Version, available on-line at www.knovel.com.*

(Continued)

*Primary Examiner* — In Suk Bullock
*Assistant Examiner* — Bradley Etherton
(74) *Attorney, Agent, or Firm* — Conley Rose, P.C.; Rodney B. Carroll; Lynda Jolly

(57) ABSTRACT

A method of deactivate a catalyst system is described. The method may include contacting a reactor effluent comprising a catalyst system, an oligomerized olefin, and diluent with a kill agent to at least partially deactivate the catalyst system, separating the reactor effluent into one or more first streams comprising oligomerized olefin and diluent, the one or more first streams being substantially devoid of the at least partially deactivated catalyst, and a second stream comprising the deactivated catalyst; and contacting the second stream with a quench agent.

26 Claims, 15 Drawing Sheets

U.S. PATENT DOCUMENTS

| | | | |
|---|---|---|---|
| 6,133,495 | A | 10/2000 | Urata et al. |
| 6,169,148 | B1 | 1/2001 | Deckers et al. |
| 6,348,547 | B1 | 2/2002 | Deckers et al. |
| 7,157,612 | B2 * | 1/2007 | Ewert et al. ............ 585/511 |
| 2004/0236163 | A1 | 11/2004 | Ewert |
| 2005/0197521 | A1 | 9/2005 | Kreischer |
| 2006/0107867 | A1 | 5/2006 | Yang et al. |
| 2007/0161839 | A1 | 7/2007 | Woodward et al. |

OTHER PUBLICATIONS

International Search Report and Written Opinion, PCT/US2009/062774, Feb. 8, 2010, 12 pages.

Krause et al, "Ullmann's Encyclopedia of Industrial Chemistry: Aluminum Compounds, Organic", 2005 Wiley-VCH Verlag, Weinheim, http://mrw.interscience.wiley.com/emrw/9783527306732/ueic/article/a01_543/current/pdf>.

* cited by examiner

SYSTEM AND METHOD OF DEACTIVATING AND QUENCHING AN OLIGOMERIZATION CATALYST

CROSS REFERENCE TO RELATED APPLICATION

This application claims priority to U.S. Provisional Patent Application No. 61/110,396 filed Oct. 31, 2008, U.S. Provisional Patent Application No. 61/110,407, filed Oct. 31, 2008, and U.S. Provisional Patent Application No. 61/110,476, filed Oct. 31, 2008. Each of these provisional patent applications is hereby incorporated by reference in its entirety.

BACKGROUND

The present techniques relate generally to oligomer production and, more specifically, to decreasing contamination in a product and/or diluent recovery of an oligomerization system.

This section is intended to introduce the reader to aspects of art that may be related to aspects of the present techniques, which are described and/or claimed herein. This discussion is believed to be helpful in providing the reader with background information to facilitate a better understanding of the various aspects of the present techniques. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains have advanced, the products (i.e., alpha olefins, oligomers, polymers, etc.) have been increasingly incorporated into or employed to produce various everyday items. In the production of these longer-chain molecules, upstream catalyst systems and compositions are utilized to oligomerize or polymerize monomers (e.g., ethylene, propylene, butene, etc.) into the longer-chain products. These catalyst systems, their preparation and subsequent deactivation can affect the efficiency of the oligomerization or polymerization.

SUMMARY OF THE EMBODIMENTS

Described herein are embodiments of a method comprising contacting a reactor effluent comprising a catalyst system, an oligomerized olefin, and diluent with a kill agent to at least partially deactivate the catalyst system; separating the reactor effluent into one or more first streams comprising oligomerized olefin and diluent, the one or more first streams being substantially devoid of the at least partially deactivated catalyst, and a second stream comprising the deactivated catalyst; and contacting the second stream with a quench agent. In some embodiments, the one or more first streams is substantially devoid of kill agent.

In some embodiments, the step of contacting the reactor effluent with the kill agent produces the at least partially deactivated catalyst system having a reduced catalytic activity. In some embodiments, the step of contacting of the reactor effluent with the kill agent produces the at least partially deactivated catalyst system having a reduced activity for isomerizing the oligomerized olefin. In some embodiments, the step of contacting the reactor effluent with the kill agent produces the at least partially deactivated catalyst system having a reduced catalytic activity and the at least partially deactivated catalyst system having a reduced activity for isomerizing the oligomerized olefin.

In some embodiments, the oligomerized olefin in the one or more streams comprising oligomerized olefin, diluent, or combinations thereof, has an isomerized olefin content less than that of the oligomerized olefin produced when compared to a method which does not at least partially deactivate the catalyst system. In some embodiments, the oligomerized olefin has an isomerized olefin content that is increased by no more than 75 percent, alternatively no more than 60 percent, alternatively no more than 50, alternatively no more than 40, alternatively no more than 30, alternatively no more than 20, alternatively no more than 10, by weight of the increased isomerized olefin when not at least partially deactivating the catalyst system. Such increase isomerized olefin content may be determined by analyzing the reactor effluent before the kill agent is added and analyzing the separated oligomerized olefin product without using a kill agent in the process (i.e., a method which does not at least partially deactivate the catalyst).

In some embodiments, the quantity of kill agent is no more than 25 percent, alternatively 20 percent, alternatively 10 percent, alternatively 5 percent, by weight greater than the quantity to provide the oligomerized olefin having an isomerized olefin content increased by no more than 75, alternatively 60, alternatively 50, alternatively 40, alternatively 30, alternatively 20, alternatively 10 percent by weight of the increased isomerized olefin when not at least partially deactivating the catalyst system.

In another embodiment, a method comprises contacting a catalyst system, ethylene, and a diluent; producing a trimerization product comprising 1-hexene in a reactor; removing a reactor effluent comprising the catalyst system, ethylene, the trimerization product, and diluent, from the reactor; contacting the reactor effluent with a kill agent to at least partially deactivate the catalyst system; distilling the reactor effluent into one or more first streams comprising ethylene, 1-hexene, diluent, or any combination thereof, the one or more streams being substantially devoid of deactivated catalyst, and a second stream comprising the deactivated catalyst system; and contacting the second stream with a quench agent. In some embodiments, the step of distilling includes one or more distilling steps. In some embodiments, the one of more first stream is substantially devoid of first kill agent as it exits the distilling step.

In the foregoing embodiments, the distilled 1-hexene has an internal hexene content less than a distilled 1-hexene when not at least partially deactivating the catalyst system. In some embodiments, the distilled 1-hexene has an internal hexene content that is increased by no more than 75 percent, alternatively 60 percent, alternatively 50 percent, alternatively 40 percent, alternatively 30 percent, alternatively 20 percent, alternatively 10 percent, by weight of the increased internal hexene when not at least partially deactivating the catalyst system. Such increase in the internal 1-hexene content may be determined by analyzing the reactor effluent before the kill agent is added and analyzing the separated 1-hexene without using a kill agent in the process (i.e., a method which does not at least partially deactivate the catalyst).

In another embodiment, the quantity of first kill agent is no more than 25 percent, alternatively 20 percent, alternatively 15 percent, alternatively 10 percent, alternatively 5 percent, by weight greater than the quantity to provide the distilled 1-hexene having an internal 1-hexene content that is increased by no more than 75 percent, alternatively 60 percent, alternatively 60 percent, alternatively 50 percent, alternatively 40 percent, alternatively 30 percent, alternatively 20 percent, alternatively 10 percent, of the internal hexane when not at least partially deactivating the catalyst system.

In any of the foregoing embodiments, the catalyst system comprises a transition metal compound and a metal alkyl. In some embodiments, the catalyst system comprises, a transition metal compound, nitrogen containing compound, and a metal alkyl. In some embodiments, the catalyst system comprises a chromium(III) carboxylate, a pyrrole, and a metal alkyl.

In some embodiments, the catalyst system comprises a chromium source, a nitrogen-containing compound, and a metal alkyl. In some embodiments, the chromium source comprises a chromium (II) or chromium (III) halide, acetonate, or carboxylate. In some embodiments, the chromium source comprises a chromium (II) or chromium (III) carboxylate. In some embodiments, the carboxylate of the chromium source comprises a C1 to C20 carboxylate. In some embodiments, the chromium carboxylate is chromium (III) 2-ethylhexanoate, chromium (III) octanoate, chromium(III) 2,2,6,6-tetramethylheptanedionate, chromium(III) naphthenate, chromium(III) acetate, chromium(III) butyrate, chromium (III) neopentanoate, chromium(III) laurate, chromium(III) stearate, chromium(III) oxalate, chromium(II) bis(2-ethylhexanoate), chromium(II) acetate, chromium(II) butyrate, chromium(II) neopentanoate, chromium(II) laurate, chromium(II) stearate, chromium(II) oxalate, or mixtures thereof. In some embodiments, the chromium carboxylate is chromium (III) 2-ethylhexanoate. In some embodiments, the nitrogen-containing compound is an amine, amide, imide, nitrile, of mixture thereof. In some embodiments, the nitrogen-containing compound is pyrrole. In some embodiments, the pyrrole is a $C_4$ to $C_{10}$ pyrrole. In some embodiments, the pyrrole is pyrrole-2-carboxylic acid, 2-acetylpyrrole, pyrrole-2-carboxaldehyde, tetrahydroindole, 2,5-dimethylpyrrole, 2,5-diethylpyrrole, 2,4-dimethyl-3-ethylpyrrole, 3-acetyl-2,4-dimethylpyrrole, ethyl-2,4-dimethyl-5-(ethoxycarbonyl)-3-pyrrole-proprionate, ethyl-3,5-dimethyl-2-pyrrolecarboxylate, pyrrole, 2,5-dimethylpyrrole, 3,4-dimethylpyrrole, 3,4-dichloropyrrole, 2,3,4,5-tetrachloropyrrole, 2-acetylpyrrole, pyrazole, pyrrolidine, and dipyrrolomethane, and mixtures thereof. In some embodiments, the pyrrole has 2,5-substitution. In some embodiments, the pyrrole is 2,5-dimethylpyrrole. In some embodiments, the pyrrole is 2,5-diethylpyrrole.

In any of the foregoing embodiments, the kill agent is contacted in an equivalent ratio of kill agent to metal atoms in the catalyst system ranging from 0.75:1 to 1.25:1. In some embodiments, the kill agent is contacted in an equivalent ratio of kill agent to metal atoms in the catalyst system ranging from 0.9:1 to 1.2:1. In some embodiments, the kill agent is contacted in an equivalent ratio of kill agent to metal atoms in the catalyst system at about 1:1.

In some embodiments, the quench agent is contacted in an equivalent ratio of quench agent to metal atoms in the at least partially deactivated catalyst system ranging from 0.5:1 to 1.5:1. In some embodiments, the quench agent is contacted in an equivalent ratio of quench agent to metal atoms in the at least partially deactivated catalyst system ranging from 0.7:1 to 1.2:1. In some embodiments, the quench agent is contacted in an equivalent ratio of quench agent to metal atoms in the at least partially deactivated catalyst system ranging from 0.8:1 to 1.1:1. In some embodiments, the quench agent is contacted in an equivalent ratio of kill agent to metal atoms in the at least partially deactivated catalyst system at about 1:1. In some embodiments, the amount of quench agent is sufficient to render the second stream non-pyrophoric.

In any of the foregoing embodiments, the method may further include recycling the diluent. In some embodiments, the recycled diluent contains substantially no kill agent. In some embodiments, the kill agent does not require a purification step to remove kill agent beyond its separation form the at least partially deactivated catalyst. In some embodiments, the diluent it is recycled to the reactor. In some embodiments, it is recycled to an oligomerization process.

In some embodiments, the kill agent is selected from a $C_4$ to $C_{30}$ alcohol. Such alcohols may include monoalcohols or polyols (e.g., diols). In some embodiments, the quench agent is selected form a $C_4$ to $C_{30}$ alcohol. In some embodiments, both the kill and the quench agent are the same and are selected from $C_4$ to $C_{30}$ alcohols.

In some embodiments, the kill agent and quench agent are independently selected from the group consisting of amines, alcohols, or mixtures thereof. In some embodiments, the kill agent and quench agent are independently selected from the group consisting of mono alcohols, diols, polyols, or mixtures thereof. In some embodiments, the kill agent is a $C_4$ to $C_{20}$ mono alcohol. In some embodiments, quench agent is a $C_4$ to $C_{20}$ mono alcohol. In some embodiments, the kill agent is selected from the group consisting of a butanol, a pentanol, a hexanol, a heptanol, an octanol, and nonanol, a decanol, a undecanol, or mixtures thereof. In some embodiments, the kill agent is selected from the group consisting of 1-butanol, 2-butanol, iso-butanol, sec-butanol, t-butanol, 1-hexanol, 2-hexanol, 3-hexanol, 1-heptanol, 2-heptanol, 3-heptanol, 4-heptanol, 1-octanol, 2-octanol, 3-octanol, 4-octanol, 2-ethyl-1-hexanol, 2-methyl-3-heptanol, 1-decanol, 2-decanol, 3-decanol, 4-decanol, 5-decanol, 1-undecanol, 2-udecanol, 7-methyl-2-decanol, a 1-docecanol, a 2-dodecanol, 2-ethyl-1-decanol, and mixtures thereof. In one embodiment, the kill agent comprises 2-ethyl-1-hexanol. In some embodiments, the kill agent and quench agent are the same.

In some embodiments, the metal alkyl comprises a group 1, 2, 12, or 13 metal. In some embodiments, the metal alkyl comprises a lithium alkyl, sodium alkyl, magnesium alkyl, boron alkyl, a zinc alkyl, or an aluminum alkyl. In some embodiments, the alkyl group(s) is a $C_1$ to $C_{10}$ alkyl group. In some embodiments, the alkyl group(s) are independently selected from a methyl group, a ethyl group, a n-propyl group, a n-butyl group, a isobutyl group or t-butyl group. In certain embodiments, the metal alkyl comprises an aluminum alkyl. In some embodiments, the metal alkyl is a trialkyl aluminum. In some embodiments, the trialkyl aluminum is selected from the group consisting of trimethyl aluminum, triethyl aluminum, tri-n-butylalumium, triisobutyl aluminum, or mixtures thereof.

BRIEF DESCRIPTION OF THE DRAWINGS

Advantages of the techniques may become apparent upon reading the following detailed description and upon reference to the drawings in which:

FIG. 2 is a flow diagram representation a separation column for the purification of a reactor effluent stream in which a kill solution is use to deactivate a catalyst in the reactor effluent stream and a quench solution is used to decrease the pyrophoric nature of the heavies stream from the separation column, in accordance with an embodiment;

DETAILED DESCRIPTION OF SPECIFIC EMBODIMENTS

Figure 1:
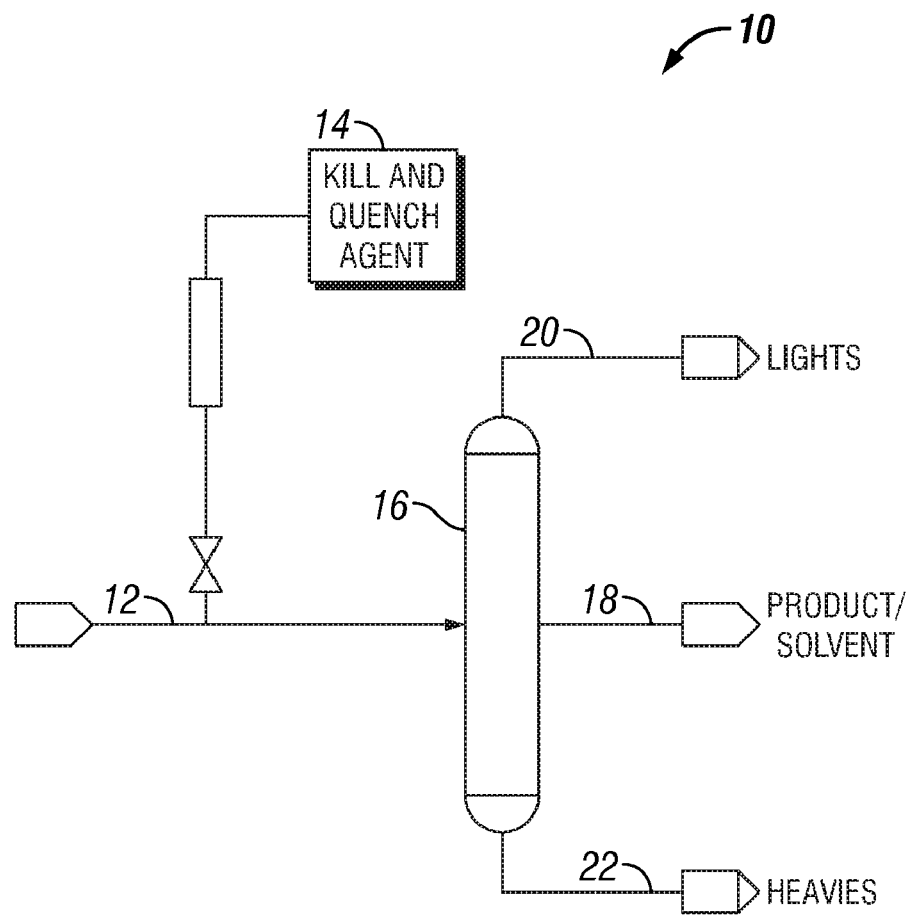
FIG. 1 is a flow diagram of a purification system in an oligomerization process.

One or more specific embodiments of the present techniques will be described herein. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

For any particular compound disclosed herein, the general structure or general name presented is intended to encompass all structural isomers, conformational isomers, and stereoisomers that may arise from a particular set of substituents, unless indicated otherwise. Thus, a general reference to a compound includes all structural isomers unless explicitly indicated otherwise; e.g. a general reference to pentane includes n-pentane, 2-methyl-butane, and 2,2-dimethylpropane. Additionally, the reference to a general structure encompasses all enantiomers, diastereomers, and other optical isomers whether in enantiomeric or racemic forms, as well as mixtures of stereoisomers, as the context permits or requires. For any particular formula that is presented, any general formula presented also encompasses all conformational isomers, regioisomers, and stereoisomers that may arise from a particular set of substituents.

Regarding claim transitional terms or phrases, the transitional term "comprising", which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Absent an indication to the contrary, when describing a compound or composition "consisting essentially of" is not to be construed as "comprising," but is intended to describe the recited component that includes materials which do not significantly alter composition or method to which the term is applied. For example, a feedstock consisting of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to feature class to which is utilized and it is possible to have different transitional terms or phrases utilized with different features within a claim. For example a method can comprises several recited steps (and other non-recited steps) but utilize a catalyst system preparation consisting of specific or alternatively consist of specific steps but utilize a catalyst system comprising recited components and other non-recited components.

While compositions and methods are described in terms of "comprising" various components or steps, the compositions and methods can also "consist essentially of" or "consist of" the various components or steps.

The terms "a," "an," and "the" are intended, unless specifically indicated otherwise, to include plural alternatives, e.g., at least one. For instance, the disclosure of "a metallocene" is meant to encompass one metallocene, or mixtures or combinations of more than one metallocene unless otherwise specified.

The term "alpha olefin" as used in this specification and claims refers to an olefin that has a double bond between the first and second carbon atom of the longest contiguous chain of carbon atoms. The term "alpha olefin" includes linear and branched alpha olefins unless expressly stated otherwise. In the case of branched alpha olefins, a branch may be at the 2-position (a vinylidene) and/or the 3-position or higher with respect to the olefin double bond. The term "vinylidene" whenever used in this specification and claims refers to an alpha olefin having a branch at the 2-position with respect to the olefin double bond. By itself, the term "alpha olefin" does not indicate the presence or absence of heteroatoms and/or the presence or absence of other carbon-carbon double bonds unless explicitly indicated. The terms "hydrocarbon alpha olefin" or "alpha olefin hydrocarbon" refer to alpha olefin compounds containing only hydrogen and carbon.

The term "linear alpha olefin" as used herein refers to a linear olefin having a double bond between the first and second carbon atom. The term "linear alpha olefin" by itself does not indicate the presence or absence of heteroatoms and/or the presence or absence of other carbon-carbon double bonds, unless explicitly indicated. The terms "linear hydrocarbon alpha olefin" or "linear alpha olefin hydrocarbon" refers to linear alpha olefin compounds containing only hydrogen and carbon.

The term "normal alpha olefin" whenever used in this specification and claims refers to a linear hydrocarbon mono-olefin having a double bond between the first and second carbon atom. It is noted that "normal alpha olefin" is not synonymous with "linear alpha olefin" as the term "linear alpha olefin" can include linear olefinic compounds having a double bond between the first and second carbon atoms and having heteroatoms and/or additional double bonds.

The term "consists essentially of normal alpha olefin(s)," or variations thereof, whenever used in this specification and claims refers to commercially available normal alpha olefin product(s). The commercially available normal alpha olefin product can contain non-normal alpha olefin impurities such as vinylidenes, internal olefins, branched alpha olefins, paraffins, and diolefins, among other impurities, which are not removed during the normal alpha olefin production process.

One of ordinary skill in the art will recognize that the identity and quantity of the specific impurities present in the commercial normal alpha olefin product will depend upon the source of commercial normal alpha olefin product. Consequently, the term "consists essentially of normal alpha olefins" and its variants is not intended to limit the amount/quantity of the non-linear alpha olefin components any more stringently than the amounts/quantities present in a particular commercial normal alpha olefin product unless explicitly stated. One source of commercially available alpha olefins products are those produced by the oligomerization of ethylene. A second source of commercially available alpha olefin products are those which are produced, and optionally isolated from, Fischer-Tropsch synthesis streams. One source of commercially available normal alpha olefin products produced by ethylene oligomerization which may be utilized as an olefin feedstock is Chevron Phillips Chemical Company LP, The Woodlands, Tex., USA. Other sources of commercially available normal alpha olefin products produced by ethylene oligomerization which may be utilized as an olefin feedstock include Inneos Oligomers (Feluy, Belgium), Shell Chemicals Corporation (Houston, Tex., USA or London, United Kingdom), Idemitsu Kosan (Tokyo, Japan), and Mitsubishi Chemical Corporation (Tokyo, Japan), among others. One source of commercially available normal alpha olefin products produced, and optionally isolated from Fisher-Tropsch synthesis streams includes Sasol (Johannesburg, South Africa), among others.

The present techniques relate to methods for deactivating a catalyst system in an effluent stream. As discussed in detail herein and generally illustrated by the purification system 10 shown in FIG. 1, a reactor effluent stream 12 may contain active catalyst system. A kill/quench agent 14 may be injected into the reactor effluent stream 12 to deactivate and kill the catalyst system and, thus, prevent the formation of undesirable compounds (e.g., isomers, other contaminants, etc.) in downstream processing systems, such as in a fractionation column 16, and in the desired product. As discussed herein, the killing and quenching of the catalyst system may be divided into a kill step and a separated quench step that occurs at different points in the downstream processes. The kill agent, also referred to herein as the deactivating agent, would be added to kill the catalyst system activity (i.e., deactivate the catalyst), and the quench agent would be added to quench the pyrophoric nature, water reactivity, and/or oxygen reactivity of the residual catalyst system residues.

The exemplary column 16 discharges light components 20, heavy components 22, and a product/diluent (e.g., solvent) stream 20. As used herein, "diluent" includes solvents, and these terms are used interchangeably in the examples. In the illustrated embodiment, product/diluent 18 exits the column 16 from a side draw. Light components 20 exit overhead and heavy components 22 exit as a bottoms stream. As appreciated by one of ordinary skill in the art, light components 20 generally refer to components having a lower vapor pressure or higher boiling point than the product or diluent, and heavy components 22 generally refer to components having a higher vapor pressure or lower boiling point than the product or diluent. The product/diluent 18 is generally further processed (not depicted) to separate diluent from the product (and to recycle the diluent for re-use in the upstream oligomerization reactor). Moreover, it should be noted that configuration of the purification system 10 may vary, such as with the product/diluent 18 exiting together with the light components 20 overhead from the column 16, for example.

The amount of kill/quench agent 14 injected into the reactor effluent 12 may be sufficient to both kill the residual catalyst components and also quench the pyrophoric nature, water reactivity, and/or oxygen reactivity of the residual catalyst system residues. For example, about 1.8 equivalents total of kill/quench agent 14 per equivalent of metal in the catalyst (eqs./eq.) may be added to the effluent 12. However, the contact time for this injection may not be sufficient to allow complete reaction of the kill/quench agent 14 with the residual catalyst prior to entry of the reactor effluent 12 into the fractionation column 16. Consequently, unreacted kill/quench agent 14 may unfortunately exit in the overhead lights stream 20 or in the product/diluent stream 18, contaminating downstream processes. As the diluent separated from the product/diluent stream 18 is generally recycled back to the oligomerization reactor, the contamination of agent 14 in the recycled diluent when the diluent is re-used in the upstream reactor may undesirably kill the catalyst system in the reactor, lowering the efficiency of the oligomerization process.

The kill/quench agent 14 addition may be divided into two or more parts. A first addition of a kill agent may be injected into the reactor effluent 12 prior to the fractionation column 16 to kill catalyst system activity and thus reduce the formation of by-products. For example, about 1.0 equivalents of kill agent to metal atom equivalents in the catalyst system may be injected in a kill solution comprising the kill agent into the reactor effluent 12 to kill or deactivate the catalyst. An addition of a quench agent may be injected downstream of the fractionation column 16, to decrease the pyrophoric nature, water reactivity, and/or oxygen reactivity of the catalyst system residues. For example, about 0.8 eqs./eq. of the quench agent 14 to total metal in the catalyst components may be injected downstream of the fractionation column 16 as a quench solution comprising the quench agent. As the recycle diluent may be removed from the purification column 16 prior to the injection of the quench solution, the amount of kill agent 14 that appears as contamination in recycle diluent may be decreased or substantially eliminated.

The alpha olefin formed in the process described herein, such as 1-hexene, may be used as a co-monomer in a polyolefin polymerization or as a feedstock to other chemical processes. By decreasing contamination of a recycled diluent with catalyst poisons in the oligomerization process, the techniques discussed herein may lower the costs and increase the purity of the alpha olefin product. In turn, this may lower the costs of downstream processes (e.g., polyolefin polymerization) that employ the alpha olefin as a feedstock.

The term "oligomerization" and its derivatives refer to processes which produce a mixture of products containing at least 70 weight percent products containing from 2 to 30 monomer units. Similarly, an "oligomer" is a product that contains from 2 to 30 monomer units while an "oligomerization product" includes all product made by the "oligomerization" process including the "oligomers" and products which are not "oligomers" (e.g. product which contain more than 30 monomer units. It should be noted that the monomer units in the "oligomer" or "oligomerization product" do not have to be the same. For example, an "oligomer" or "oligomerization product" of an "oligomerization" process using ethylene and propylene as monomers may contain both ethylene and/or propylene units.

The term "trimerization," and it derivatives, refer to a processes which produce a mixture of products containing at least 70 weight percent products containing three and only three monomer units. A "trimer" is a product which contains three and only three monomer units while a "trimerization product" includes all products made by the trimerization process including "trimer" and products which are not "trimer" (e.g. dimers or tetramers). Generally, an olefin trimerization reduces number of olefinic bonds, i.e., carbon-carbon double bonds, by two when considering the number of olefin bonds in the monomer units and the number of olefin bonds in the trimer. It should be noted that the monomer units in the "trimer" or "trimerization product" do not have be the same. For example, a "trimer" of a "trimerization" process using ethylene and butene as monomers may contain ethylene and/or butene monomer units. That is to say the "trimer" will include $C_6$, $C_8$, $C_{10}$, and $C_{12}$ products. In another example, a "trimer" of a "trimerization" process using ethylene as the monomer contain ethylene monomer units. It should also be noted that a single molecule may contain two monomer units. For example dienes, such as 1,3-butadiene and 1,4-pentadiene, have two monomer units within one molecule.

Split Injection of Kill Solution and Quench Solution

Figure 2:
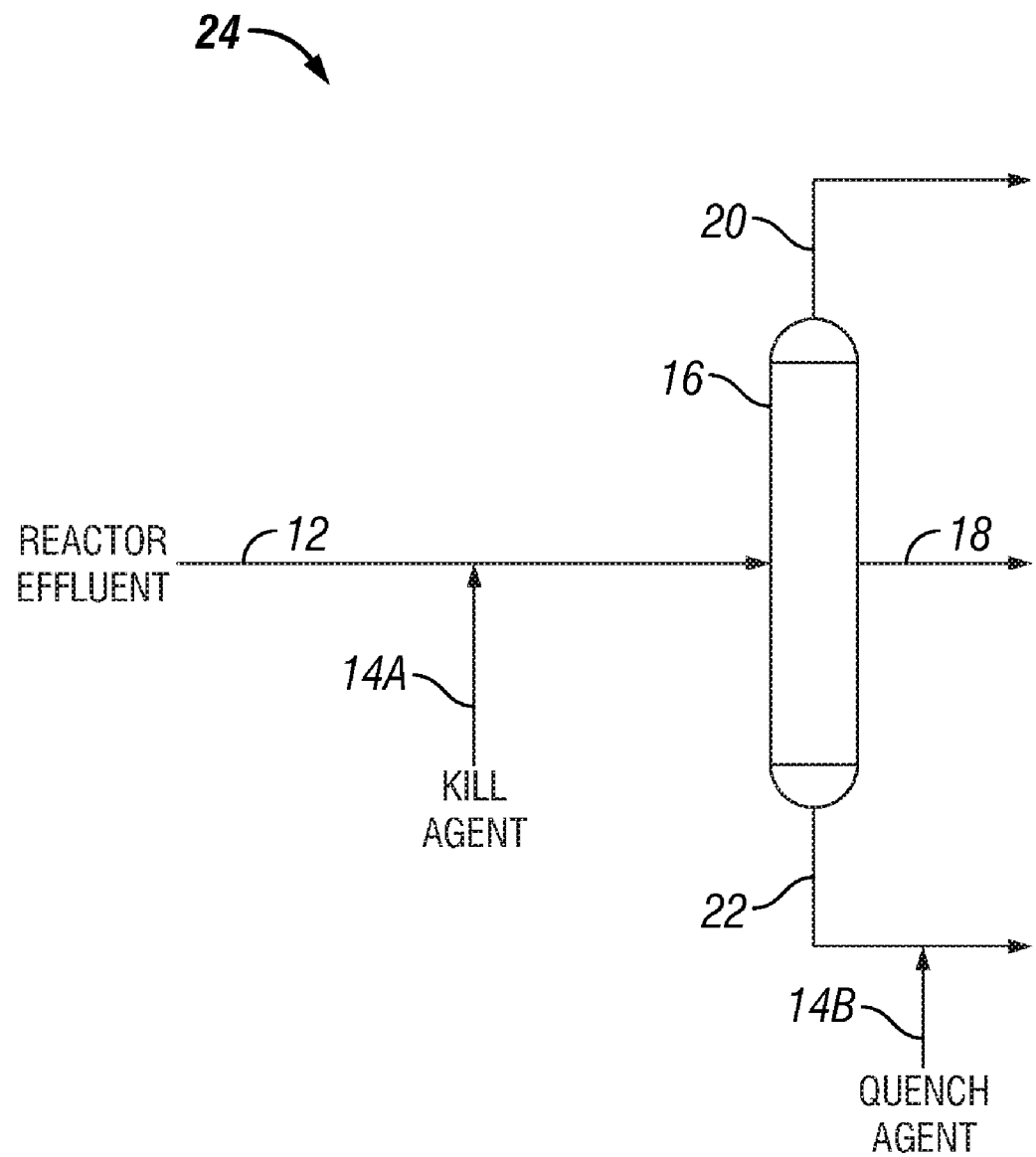
FIG. 2 is a flow diagram of a purification system in an oligomerization process in accordance with embodiments of the present techniques.

Referring to FIG. 2, a process flow diagram depicts a separation system 24 for the initial purification of an effluent 12 from a reactor, such as from an oligomerization or trimerization reactor. However, the techniques described herein to kill the catalyst systems and quench catalyst system residues may be used with number of chemical processes. For example, other types of oligomerization reactors and, indeed, reactors for other types of chemical products may use a separate addition of a kill solution before a purification column and a quench solution after a purification column as discussed herein. These alternate reactors and reactor systems are considered to be within the scope of the present techniques. For a discussion of applicable exemplary oligomerization processes, such as exemplary trimerization processes, see U.S. Pat. No. 7,384,886, U.S. Patent Application Publication No. 2002/0182124, and U.S. Patent Application Publication No. 2004/0236163, and U.S. Patent Application Publication No. 2005/0197521, all four of which are incorporated herein by reference in their entirety for all purposes.

The separation system 24 uses an addition (kill agent 14A) of a kill agent (FIG. 1) to kill a catalyst system before a fractionation column 16 and a separate addition (quench agent 14B) of the kill and quench agents to at least partially deactivate the catalyst system which is with the other heavy components (e.g., collectively referred to herein as a heavies stream 22) downstream of the fractionation column 16. Such a system 24 may be used in an oligomerization or trimerization reaction process to decrease the probability that contamination from the kill or quench agent will be returned to a reactor through a recycle diluent system, for example. Moreover, it may be beneficial to deactivate the catalyst components via the kill agent 14A prior to subjecting the catalyst system to any downstream higher temperatures in the purification system (e.g., in a column reboiler). Yet, the quenching via quench agent 14B may occur further downstream after the oligomerization product has been separated from the killed (deactivated) catalyst system residues.

Theoretically, the kill agent 14A may be added in an amount such that about one equivalent of kill agent reacts with one equivalent of metal atom of the catalyst system. However, other ratios may be appropriate and ranges are given throughout the specification. The desired ratio reduces or kills the activity of catalyst system and thus reduces degrading of the oligomerization product during downstream distillation but may leave the catalyst system residue pyrophoric. Theoretically, the quench agent 14A may be subsequently added in an amount such that the equivalents of kill agent 14A plus quench agent 14B react with all the equivalents of metal alkyl bonds. This reduces the pyrophoric nature, water reactivity, and/or oxygen reactivity of the residual catalyst system residues.

Generally, the reactor effluent 12 may include compounds such as diluent, product, heavies, lights, and active catalyst system. A kill agent 14A and a quench agent 14B may be stored in vessels for addition to the process to kill or quench the catalyst. If the kill agent 14A and the quench agent 14B are the same compound, they may be sourced from the same vessel or supply. Moreover, water and other contaminants may be removed from the agents 14A and 14B in a dryer, for example. Lastly, it should be emphasized that the present techniques do not preclude adjusting the amounts of agents 14A and 14B added to the process for other purposes. For example, if desired in certain embodiments, the amount of kill agent 14A may be increased to provide for quenching in addition to thorough deactivation of the catalyst components in the effluent 12 (upstream of the fractionation column 16).

Generally, the kill agent 14A (and optionally quench agent 14B) is selected to be soluble in the reactor effluent stream 12. The kill and quench agents may include $C_4$ to $C_{30}$, $C_4$ to $C_{20}$, or $C_4$ to $C_{12}$ amines. The kill agent 14A selected may have a boiling point such that it does not form an azeotrope with the olefin monomer product. In the trimerization of ethylene to 1-hexene, exemplary alcohol kill agents include, but are not limited to butanol, pentanol, hexanol, heptanol, octanol, nonanol, decanol and mixtures thereof; alternatively, 1-hexanol, 2-hexanol, 3-hexanol, 2-ethyl-1-hexanol, 3-octanol, 1-heptanol, 2-heptanol, 3-heptanol, 4-heptanol, 2-methyl-3-heptanol, 1-octanol, 2-octanol, 3-octanol, 4-octanol, 7-methyl-2-decanol, 1-decanol, 2-decanol, 3-decanol, 4-decanol, 5-decanol, 2-ethyl-1-decanol, and mixtures thereof. In an embodiment, the kill agent 14A agent may be 2-ethyl-1-hexanol.

Although a single kill/quench agent 14 (see FIG. 1) has been discussed herein, it should be understood that the kill agent 14A solution and the quench agent 14B solution do not have to be the same material. For example, the quench agent 14B may be water, or other compounds. The use of different materials for the kill agent 14A and the quench agent 14B is considered to be within the scope of the present techniques. Moreover, it should be noted that certain compounds (e.g., hydrocarbon solvent) in a kill solution having the kill agent may be acceptable in the process and/or not result in contamination. Generally, it may be the kill agent itself that is a contaminant and should be removed from recycled diluent or other streams.

The addition of the kill agent 14A to the reactor effluent 12 may take place near a control valve, for example, to facilitate mixing of the kill agent 14A with the effluent 12. In one example, the kill agent 14A is injected downstream of a pressure control valve of the oligomerization reactor. In another example, the kill agent 14A may be added immediately upstream of the pressure control valve. However, for injection of agent 14A upstream of a valve, the valve should typically be sufficiently isolated from the reactor to prevent contamination, e.g., at the end of a leg or pipe coming from the reactor. In these examples, as the reactor effluent 12 flashes across a control valve, the turbulence may assist the mixing of the kill agent 14A with the reactor effluent 12. The amount of kill agent 14A injected may be controlled by a kill addition control valve. The kill addition control valve may be adjusted based on the rate of catalyst flow into the reactor, maintaining the proportion or ratio of the kill agent 14A to metals in the active catalyst substantially constant, e.g., at around 1.0 eqs./eq., and so forth.

A quench agent 14B may be added to the heavies stream 22 or at other downstream points. The quench agent 14B may be added near a control valve to facilitate mixing, near a reboiler (not depicted) on the heavies stream 22 of column 16, and so on. The amount of quench agent 14B added may be adjusted based on the amount of catalyst system added to the upstream oligomerization reactor, a flow rate of the heavies 22, and so forth. Again, the quench agent 14B may also be added to other process units, such as a downstream heavies storage tank, among others.

The fractionation column 16 may be a continuous distillation column with separation stages comprised of trays, packing material, or combinations thereof. One potential fractionation column 16 may have three exit streams, a heavies stream 22, a product/diluent stream 18, and a lights stream 20. Other processes may have different configurations. Examples of other fraction systems which may be utilized may be found in the documents attached as part of this disclosure.

The lights stream 20 may include ethylene and reaction co-products, such as hydrocarbon compounds having less than about 5 carbon atoms per molecule. The lights stream may also include other non-hydrocarbon compounds such as hydrogen, nitrogen, oxygen, carbon monoxide, carbon dioxide, and water. The product/diluent stream 18 generally includes compounds having similar boiling points, for example, compounds having similar numbers of carbons. In an embodiment, the product/diluent stream 18 contains the $C_6$ compounds product 1-hexene and diluent cyclohexane. The heavies stream 22 may include hydrocarbon compounds having from about 7 to about 100 carbon atoms per molecule. Heavies 22 may also include higher olefinic products, such as, for example decenes and tetradecenes, as well as polymeric products, catalyst system residues, and deactivated catalyst system.

The fractionation column 16 may be heated by recycling a portion of the heavies stream 22 back to the fractionation column 16 through a reboiler, for example. In that example, the reboiler (i.e., heat exchanger) may be supplied with heat transfer fluid, such as steam. Moreover, a portion of the lights 22 may be condensed and returned to the column 16 as reflux. In certain embodiments, an accumulator vessel or reflux drum, or and/or reflux pumps, may facilitate introduction of the condensed lights 22 as reflux to the column 16.

Figure 3:
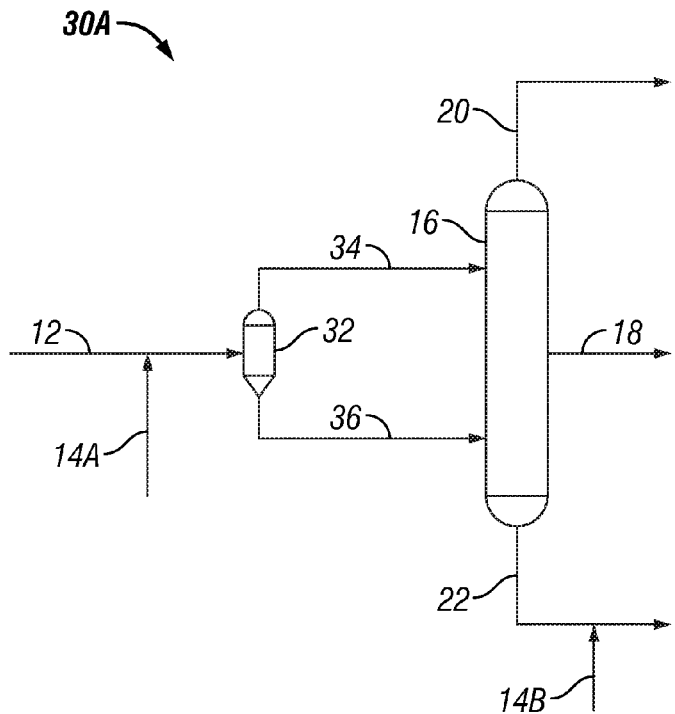
FIG. 3 is a flow diagram of a purification system in an oligomerization process in accordance with embodiments of the present techniques.

Referring to FIG. 3, an optional flash drum 32 (or vapor/liquid separator) is depicted in purification system 30. The reactor effluent 12 may be introduced into a flash drum 32, which separates the reactor effluent 12 into a vapor stream 34 and a liquid stream 36. This initial separation divides light components that may be present in the reactor effluent 12, such as hydrogen, ethylene, and the like, from higher boiling components, such as 1-hexene, diluent, and catalyst residues. Both streams 34 and 36 are introduced into the fractionation column 16. Employment of a flash drum 32 may improve the efficiency of column 16.

Producing an Oligomer with Split Kill and Quench

Figure 4:
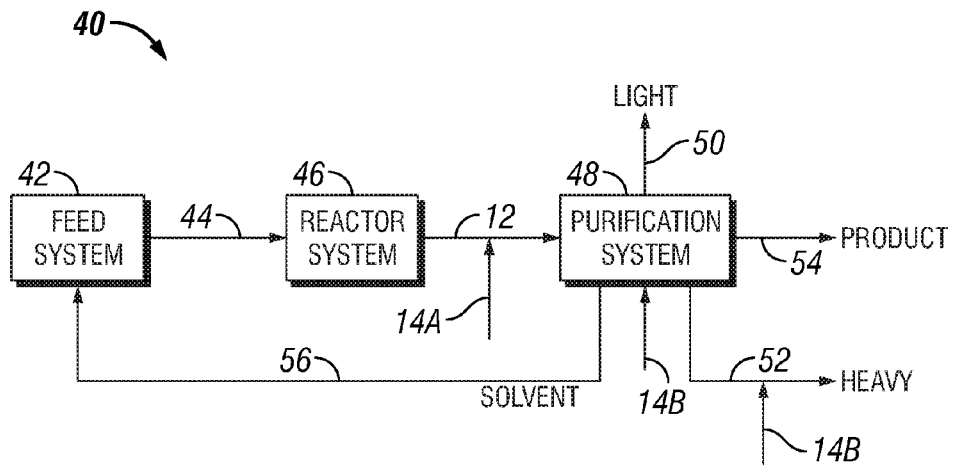
FIG. 4 is a flow diagram of an oligomerization process in accordance with embodiments of the present techniques.

FIG. 4 depicts an exemplary oligomerization system 40 employing separate injection of kill agent 14A and quench agent 14B. A feed system 42 prepares and provides one or more feed streams 44 to an oligomerization reactor in the reactor system 46. Feed steams 44 may include one or more feed olefins, diluents, hydrogen, catalyst components, and catalyst systems. For applicable examples of oligomerization catalyst systems, and their exemplary preparation, see attached U.S. Pat. Nos. 6,133,495 & 7,384,886 which are incorporated herein by reference in their entirety for all purposes.

In the reactor, the feedstock olefin is oligomerized into an oligomer (e.g., hexene, octene, decene, dodecene, etc.) in the presence of a catalyst system, and optionally diluent, hydrogen, and other compounds. A reactor effluent stream 12 having the oligomer product discharges from the reactor system 46 and enters a purification system 48. In the purification system 48, one or more lights or olefin streams 50 and one or more heavies streams 52 are separated from the oligomer product 54. Diluent 56 may also be separated from the oligomer product, and optionally recycled to the feed system 42 or reactor system 46. Again, for a discussion of applicable exemplary oligomerization processes and associated purification systems, see U.S. Pat. No. 7,384,886, U.S. Patent Application Publication No. 2002/0182124, U.S. Patent Application Publication No. 2004/0236163, and U.S. Patent Application Publication No 2005/0197521, which are hereby incorporated by references in their entireties for all purposes. Kill agent 14A is injected into the effluent stream 12 to deactivate residual catalyst components. Quench agent 14B is injected intermediate in the purification system 48 or into at least partially deactivated catalyst streams 52 to quench the pyrophoric nature of residual catalyst components.

Figure 5:
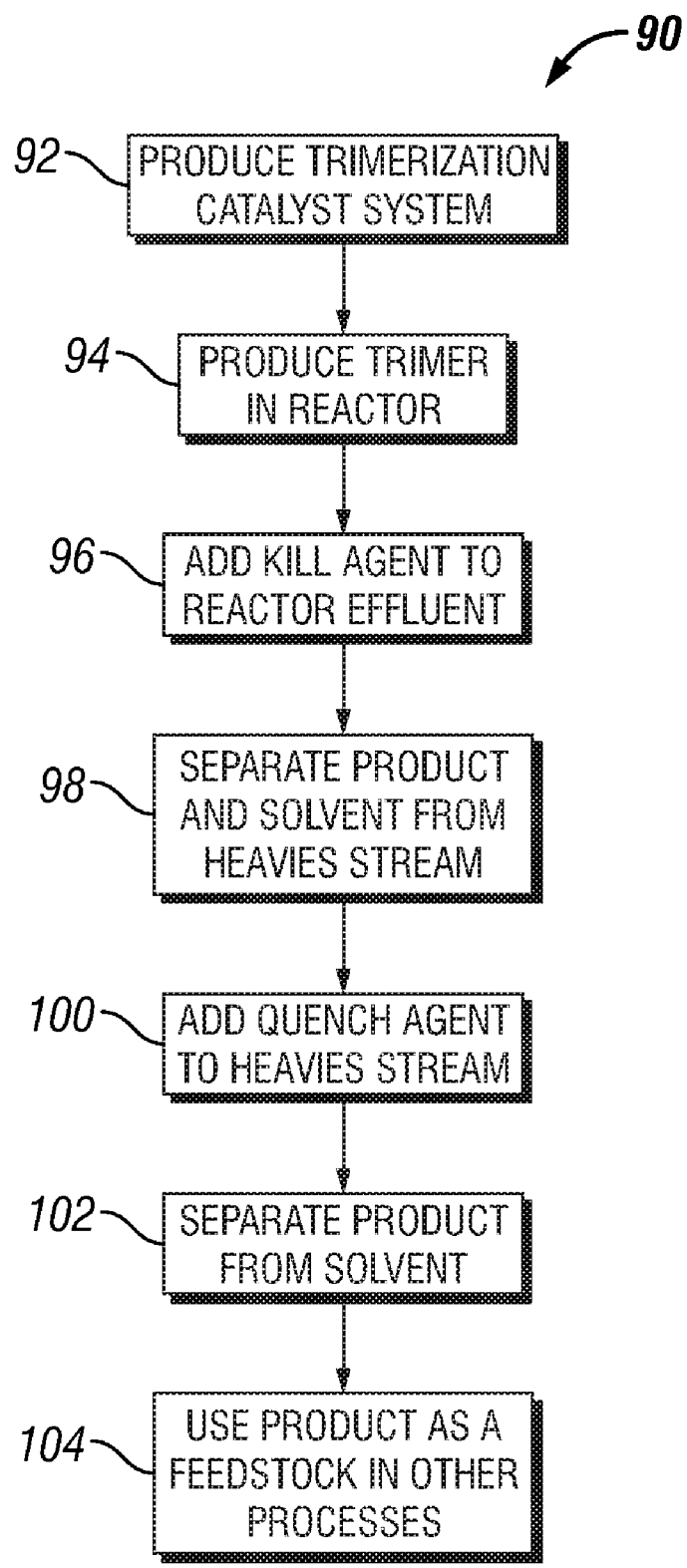
FIG. 5 is a block diagram of oligomerization method in accordance with embodiments of the present techniques.

A method 90 for manufacturing and using an oligomer or trimer product is illustrated by the flow chart in FIG. 5. The method 90 takes advantage of the techniques disclosed herein for killing (i.e., deactivating) catalyst in a reactor effluent 12 and quenching catalyst components downstream of an effluent fractionation or purification column, such as in a bottoms or heavies stream 22 of column 16 (see FIG. 2). Oligomerization or trimerization catalyst systems are prepared (block 92). The oligomerization or trimerization catalyst systems may be utilized in a reactor system to produce an oligomer or trimer product (block 94).

The oligomer or trimer product may be removed from the reactor in an effluent stream (e.g., reactor effluent 12), which may also contain diluent and active catalyst components. As indicated in block 96, a kill solution comprising a kill agent (e.g., kill agent 14B) may be injected into the reactor effluent to deactivate the catalyst system in the effluent prior to an initial fractionation or purification of the oligomer or trimer product. Subsequently, in the initial purification, indicated in block 98, the reactor effluent stream 12 is separated into two or more streams, such as a heavies stream 22, a product/diluent stream 18, and a lights stream 20. The heavies stream 22 may include at least partially deactivated catalyst system, which may remain substantially pyrophoric, water reactive, and/or oxygen reactive. The water reactivity and/or oxygen reactivity of the heavies stream 22 may be substantially quenched by the addition of a quench solution comprising the quench agent 14B into the heavies stream 22, as indicated in block 100, or into downstream locations to quench the water reactivity and/or oxygen reactivity of heavy components, such as in split heavy streams, downstream columns, heavies storage tank, and so on.

Figure 17:
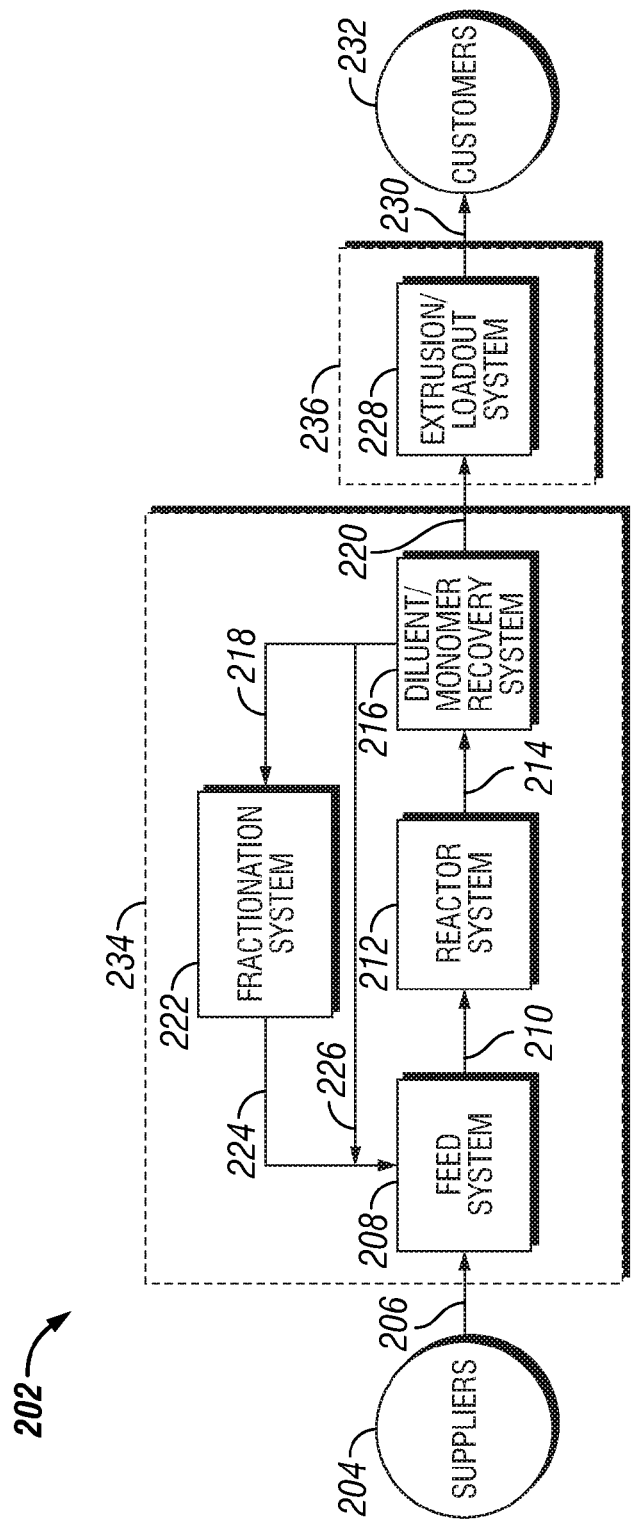
FIG. 17 is a flow diagram of a process to make a polyolefin system in accordance with embodiments of the present techniques.

The oligomer or trimer product and diluent discharged from the purification column may be processed to separate diluent from the product, as indicated in block 102. The method 90 may be implemented using any number of plant configurations for the trimerization process, as discussed with respect to FIGS. 8-16. The separated product may be sold, stored for later use, or used as a feedstock in downstream processes, as indicated in block 104. An example of a downstream process that may use the trimers (e.g., 1-hexene) as a feedstock is the formation of polyolefin polymers, as discussed with respect to FIG. 17.

Catalyst Formation and Use

Figure 6:
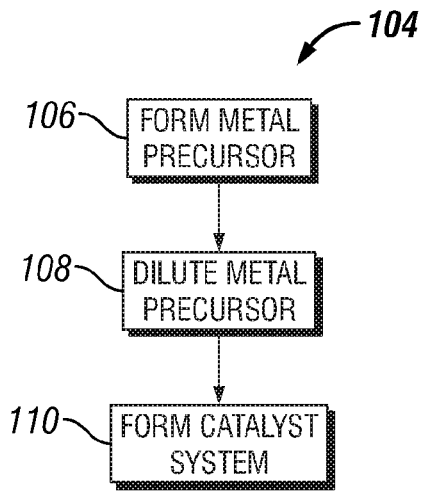
FIG. 6 is a block diagram of method for preparing a metal precursor solution and subsequent catalyst system in accordance with embodiments of the present techniques.

FIG. 6 depicts an exemplary method 104 for forming catalyst components and/or a catalyst system for use in an oligomerization reactor. In certain examples, a metal precursor may be formed or received (block 106). The metal precursor may include chromium, nickel, cobalt, iron, molybdenum, or copper, among others. Chromium compounds that may be used as the metal precursor include organic or inorganic compounds in which the chromium oxidation state is from 0 to 6.

Generally, the chromium source will have a formula of $CrX_n$, in which each X can be the same or different and may be any organic or inorganic radical, and n may be an integer from 1 to 6. Organic radicals that may be used for X, may have from about 1 to about 20 carbon atoms per radical, and may include alkyl, alkoxy, ester, ketone, carboxylate or amido radicals, among others. The organic radicals may be straight-chained or branched, cyclic or acyclic, aromatic or aliphatic, and may include mixed aliphatic, aromatic, or cycloaliphatic groups. Exemplary inorganic radicals include, but are not limited to, any anion or oxidizing radical, for example, halides, sulfates, or oxides. Exemplary metal precursor include, but are not limited to, chromium compounds, such as organometallic chromium (II) or chromium (III) compounds, or a mixture thereof.

The organometallic chromium compounds which may be used as the metal source for the oligomerization catalyst system may be a chromium(II) carboxylate or a chromium (III) carboxylate; alternatively, a chromium(II) carboxylate; or alternatively, a chromium(III) carboxylate. Each carboxylate of the chromium(II) or chromium(III) carboxylate may be a $C_1$ to $C_{20}$, a $C_3$ to $C_{15}$, or a $C_4$ to $C_{10}$ carboxylate. In an embodiment, the carboxylate group may be an acetate, a propionate, a butyrate, a pentanoate, a hexanoate, a heptanoate, an octanoate, a nonanoate, a decanoate, an undecanoate, a dodecanoate, a tridecanoate, a tetradecanoate, a pentadecanoate, a hexadecanoate, a heptadecanoate, or an octadecanoate; or alternatively, a pentanoate, a hexanoate, a heptanoate, a octanoate, a nonanoate, a decanoate, a undecanoate, or a dodecanoate. In some embodiments, the carboxylate group may be acetate, propionate, n-butyrate, valerate (n-pentanoate), neo-pentanoate, capronate (n-hexanoate), n-heptanoate, caprylate (n-octanoate), 2-ethylhexanoate, n-nonanoate, caprate (n-decanoate), n-undecanoate, laurate (n-dodecanoate), or stearate (n-octadecanoate); alternatively, valerate (n-pentanoate), neopentanoate, capronate (n-hexanoate), n-heptanoate, caprylate (n-octanoate), 2-ethylhexanoate, n-nonanoate, caprate (n-decanoate), n-undecanoate, or laurate (n-dodecanoate); alternatively, capronate (n-hexanoate); alternatively, n-heptanoate); alternatively, caprylate (n-octanoate); or alternatively, 2-ethylhexanoate. Exemplary chromium(II) carboxylate may include, but are not limited to, chromium(II) acetate, chromium(II) propionate, chromium(II) butyrate, chromium(II) neopentanoate, chromium(II) oxalate, chromium(II) octanoate, chromium(II) (2-ethylhexanoate), chromium(II) laurate, or chromium(II) stearate. Exemplary chromium(III) carboxylates may include, but are not limited to, chromium (III) acetate, chromium(III) propionate, chromium(III) butyrate, chromium(III) neopentanoate, chromium(III) oxalate, chromium(III) octanoate, chromium (III) 2-ethylhexanoate, chromium(III) 2,2,6,6-tetramethylheptanedionate, chromium(III) naphthenate, chromium(III) laurate, or chromium(III) stearate. In an embodiment, the organometallic chromium compound which may be used as the metal source for the oligomerization catalyst system is chromium (II) 2-ethylhexanoate or chromium(III) 2-ethylhexanote; or alternatively chromium(III) 2-ethylhexanoate. Excess reactants and by-products may be removed from the metal precursor by any number of techniques known in the art, as indicated in block 110. Such techniques may include vacuum stripping, filtering, diluent washing, or any number of other techniques.

The metal precursor may be diluted with a diluent (e.g., alcohol), to form a metal precursor solution, as indicated by reference numeral 108. Diluents that may be used for the dilution include any number of aromatic, olefinic, or aliphatic solvents. Typically, the diluent may be a $C_6$ to $C_{30}$, or alternatively a $C_6$ to $C_{18}$ diluent. For example, diluents that may be used for the dilution of the metal precursor include cyclohexane, ethylbenzene, olefins, or alpha olefins. Exemplary alpha olefin diluents include, but are not limited to, 1-hexene, 1-octene, 1-decene, 1-dodecene, 1-tetradecene, 1-hexadecene, or 1-octadecene, or combinations thereof, among others. The choice of the diluent may be made on the basis of selectivity, viscosity, flashpoint, cost, and availability, among others.

The catalyst system for the oligomerization may be formed from the metal precursor or metal precursor solution (block 110). In one example, the metal precursor is combined with a metal alkyl and a nitrogen containing compound. The catalyst system components may be contacted in various orders or under any various conditions to prepare the catalyst composition. For example, the metal precursor solution may be contacted with the nitrogen compound first or substantially simultaneously with the metal alkyl, and so on. Other methods for mixing the components of the catalyst system may be found in other documents incorporated by reference in this disclosure.

The catalyst system preparation, including contacting a pyrrole-containing compound and the metal alkyl may be performed in any alkyl or aromatic diluent. Generally, the catalyst composition preparation is performed in an unsaturated hydrocarbon. The unsaturated hydrocarbon may be any aromatic or aliphatic hydrocarbon and may have any number of carbon atoms per molecule. However, the unsaturated hydrocarbon will generally comprise less than about 70 carbon atoms per molecule or less than about 20 carbon atoms per molecule, due to commercial availability and ease of use. Aliphatic hydrocarbon compounds that may be used as the diluent include, but are not limited to, ethylene, 1-hexene, 1,3-butadiene, and mixtures thereof. Aromatic hydrocarbons that may be used as the diluent for the catalyst system. Typically, the aromatic hydrocarbon diluent may be $C_6$ to $C_{20}$, $C_6$ to $C_{15}$, or $C_6$ to $C_{10}$ aromatic compounds. Exemplary aromatic hydrocarbons include, but are not limited to, toluene, benzene, ethylbenzene, xylene, mesitylene, hexamethylbenzene, and mixtures thereof. Generally, aromatic hydrocarbons may improve catalyst system stability and produce an active and selective catalyst system. In an embodiment, the unsaturated hydrocarbon may be toluene; or alternatively, ethyl benzene.

The temperature for the catalyst composition preparation may be between about −78° C. and 200° C., between about 0° C. and 50° C., or between about 5° C. and about 40° C. The temperature may be controlled, for example, between 20° C. and 30° C., to decrease particle formation and increase catalyst system activity and productivity. The catalyst system preparation may be performed under an inert atmosphere, such as nitrogen or argon, to purge water vapor and oxygen from the reaction vessel. Nitrogen may generally be used due to cost and availability.

The nitrogen-containing compounds that may be used to form the catalyst system include amines, amides, imides, nitrile, and pyrroles. For example, amines that may be used to form the catalyst system may include $C_3$ to $C_{20}$/$C_3$ to $C_{15}$, or $C_3$ to $C_{10}$, amines Applicable amines may be primary or secondary amines. In an embodiment, useful amines may include mono-hydrocarbylamines; or alternatively, di-hydrocarbylamines. Each hydrocarbyl group(s) of the mono- or di-hydrocarbylamines may be independently selected from a $C_1$ to $C_{10}$ alkyl group, a $C_5$-$C_{10}$ cycloalkyl group, a $C_6$-$C_{10}$ aryl group; or a $C_7$-$C_{10}$ alkylaryl group; alternatively, a $C_1$ to $C_{10}$ alkyl group; a $C_5$-$C_{10}$ cycloalkyl group; alternatively, a $C_6$-$C_{10}$ aromatic group; or alternatively, a $C_7$-$C_{10}$ alkylaryl group. Applicable alkyl group(s) for that mono- or di-hydrocarbylamines alkanes include a methyl group, an ethyl group, a propyl group, a butyl group, a pentyl group, a hexyl group, a heptyl group, an octyl group, a nonyl group, or a decyl group; alternatively, a methyl group, an ethyl group, a propyl group, a butyl group, a pentyl group; alternatively, a methyl group, an ethyl group, an n-propyl group, an isopropyl group, an n-butyl group, an iso-butyl group, a sec-butyl group, a tert-butyl group, an pentyl group, or a neopentyl group; alternatively, a methyl group; alternatively, an ethyl group; alternatively, an n-propyl group; alternatively, an isopropyl group; alternatively, an n-butyl group; alternatively, an iso-butyl group; alternatively, a sec-butyl group; alternatively, a tert-butyl group; alternatively, an pentyl group; or alternatively, a neopentyl group. Applicable cycloalkyl group(s) for the mono- or di-hydrocarbylamines include a cyclopentyl group or a cyclohexyl group; alternatively, a cyclopentyl group; or alternatively, a cyclohexyl group. Applicable aryl group(s) for the mono- or di-hydrocarbylamines include a phenyl group, a tolyl group, or a xylyl, alternatively, a phenyl group; alternatively a tolyl group, alternatively, a xylyl group. Applicable alkylaryl group(s) for the mono- or di-hydrocarbylamines include a benzyl group. Exemplary primary amines include, but are not limited to ethylamine, isopropylamine, cyclohexylamine, benzylamine, aniline, and naphthylamine. Exemplary secondary amines, include but are not limited to, diethylamine, diisopropylamine, dicyclohexylamine, dibenzylamine, bis(trimethylsilyl)amine, morphorine, imidazole, indoline, indole, and the like. Amides that may be used to form the catalyst system include $C_0$ to $C_{20}$, $C_2$ to $C_{10}$, amides. Exemplary amide include, but are not limited to, lithium amide, sodium ethylamide, calcium diethylamide, lithium diisopropylamide, potassium benzylamide, sodium bis (trimethylsilyl)amide, and lithium indolide.

The pyrrole-containing compound may be any pyrrole-containing compound, or pyrrolide, that will react with a chromium source to form a chromium pyrrolide complex. As used in this disclosure, the term "pyrrole-containing compound" refers to hydrogen pyrrolide, i.e., pyrrole ($C_5H_5N$), derivatives of hydrogen pyrrolide, substituted pyrrolides, as well as metal pyrrolide complexes. A "pyrrolide" is defined as a compound comprising a 5-membered, nitrogen-containing heterocycle, such as for example, pyrrole, derivatives of pyrrole, and mixtures thereof. Broadly, the pyrrole-containing compound may be pyrrole or any heteroleptic or homoleptic metal complex or salt containing a pyrrolide radical or ligand.

Generally, the pyrrole-containing compound may be a $C_4$ to $C_{20}$, or $C_4$ to $C_{10}$ pyrrole. Exemplary pyrrole-containing compounds that may be used as the nitrogen compound in the oligomerization catalyst system include, but are not limited to pyrrole-2-carboxylic acid, 2-acetylpyrrole, pyrrole-2-carboxaldehyde, tetrahydroindole, 2,5-dimethylpyrrole, 2,4-dimethyl-3-ethylpyrrole, 3-acetyl-2,4-dimethylpyrrole, ethyl-2,4-dimethyl-5-(ethoxycarbonyl)-3-pyrrole-proprionate, ethyl-3,5-dimethyl-2-pyrrolecarboxylate, pyrrole, 2,5-dimethylpyrrole, 3,4-dimethylpyrrole, 3,4-dichloropyrrole, 2,5-diethylpyrrole, 2-methyl-5-ethylpyrrole, 2-methyl-5-propylpyrrole, 2,3,4,5-tetrachloropyrrole, 2-acetylpyrrole, pyrazole, pyrrolidine, and dipyrrolomethane, and mixtures thereof, among others. Pyrrolides that may be used as the nitrogen compound include: diethylaluminum 2,5-dimethylpyrrolide; ethylaluminum di(2,5-dimethylpyrrolide); and aluminum tri(2,5-dimethylpyrrolide); among others. In an embodiment, the pyrrole-containing compound may be 2,5-dimethylpyrrole. In an embodiment, the pyrrole-containing compound may be 2,5-diethyl pyrrole. The selection of the pyrrole-containing compound may be made on the basis of cost, availability, and activity. For example, pyrrole or 2,5-dimethylpyrrole may be used as the nitrogen compound, as these compounds may have higher availability or provide higher activity than other nitrogen compounds listed herein.

The metal alkyl may be any heteroleptic or homoleptic metal alkyl compound, and a mixture of metal alkyl compounds may be used. The ligands on the metal may be aliphatic, aromatic, or any combinations thereof. Generally, the ligands are any saturated or unsaturated aliphatic hydrocarbon radicals. The metal alkyl may have any number of carbon atoms. However, due to commercial availability and ease of use, the metal alkyl may have less than about 70 carbon atoms per metal alkyl molecule or less than about 20 carbon atoms per molecule. Types of metal alkyls that may be used include alkylaluminum compounds, alkylboron compounds, alkylmagnesium compounds, alkylzinc compounds, alkyl lithium compounds, or combinations thereof. For example, metal alkyls that may be used include n-butyl lithium, s-butyllithium, t-butyllithium, diethylmagnesium, diethylzinc, triethylaluminum, trimethylaluminum, triisobutylalumium, and mixtures thereof.

In an aspect, the metal alkyl may be a non-hydrolyzed alkylaluminum compound. In an embodiment, the non-hydrolyzed alkyl aluminum compound may be a Trialkylalumium compound, an alkyl aluminum halide, or and alkyl aluminum alkoxide. Generally, each alkyl group of any metal alkyl described herein, if there is more than one, may independently be a $C_1$ to $C_{20}$ alkyl group; alternatively, a $C_1$ to $C_{10}$ alkyl group; or alternatively, a $C_1$ to $C_6$ alkyl group. In an embodiment the alkyl group(s) may independently be a methyl group, an ethyl group, an n-propyl group, an isopropyl group, an n-butyl group, an iso-butyl group, a sec-butyl group, or a tert-butyl group.

In an aspect the metal alkyl may be trialkyl aluminum compound, a dialkyl aluminum halide compound, an alkyl aluminum dihalide compound, or mixtures thereof. Applicable alkyl groups and halide for the metal alkyl and/or metal alkyl halides are described herein and may be utilized to further describe the trialkyl aluminum compound, a dialkyl aluminum halide compound, an alkyl aluminum dihalide compound.

Exemplary trialkyl aluminum compounds may include but are not limited to, trimethyl aluminum, triethyl aluminum, tripropyl aluminum, tri-n-butyl aluminum, or tri-isobutyl aluminum, or mixtures thereof. Exemplary alkyl aluminum halide compounds may include, but are not limited to, diethylaluminum chloride, diethylaluminum bromide, ethylaluminum dichloride, ethylaluminum sesquichloride, and mixtures thereof. In an embodiment, the trialkyl aluminum compound may be triethyl aluminum.

In an aspect the metal alkyl compound may be a mixture of a trialkyl aluminum compound and an alkyl aluminum halide. Generally, the trialkyl aluminum compound of the mixture may be any trialkyl aluminum compound described herein. The alkyl aluminum halide compound of the mixture may be any alkyl aluminum compound described herein. In some embodiments, the mixture of the trialkyl aluminum compound and the alkyl aluminum halide may comprise, or consist essentially of, triethyl aluminum and diethyl aluminum chloride, triethyl aluminum and ethyl aluminum dichloride, or triethyl aluminum and ethyl aluminum sesquichloride. In an embodiment, the metal alkyl component of the oligomerization catalyst system may be a mixture of triethyl aluminum and diethyl aluminum chloride.

While not wishing to be bound by theory, it is believed that a halogen-containing compound can improve the product purity and selectivity of the oligomerization process. In some embodiments, the halogen-containing compound may be a chloride-containing compound, bromide-containing compound, or an iodide-containing compound. In an embodiment, the halogen-containing compound may be a chloride-containing compound.

In an aspect, the halogen-containing compound, regardless of whether it is a chloride-, bromide-, or iodide-containing compound, may be a metal halide, alkyl metal halide, or an organic halide. In an embodiment, the halogen-containing compound may be a metal chloride; alternatively, a metal bromide; or alternatively, a metal iodide. In an embodiment, the halogen-containing compound may be a metal alkyl chloride; alternatively, a metal alkyl bromide; or alternatively, a metal iodide. In an embodiment, the halogen-containing compound may be an organic chloride; alternatively, an organic bromide; or alternatively, an organic iodide.

In an aspect, the metal halide may comprise a group 3, 4, 5, 6 (except for chromium), 13, 14, or 15 metal. In some embodiments, the metal halide may be selected form the group consisting of scandium chloride, yttrium chloride, lanthanum chloride, titanium tetrachloride, zirconium tetrachloride, hafnium tetrachloride, boron trichloride, aluminum chloride, gallium chloride, silicon tetrachloride, trimethyl chlorosilane, germanium tetrachloride, tin tetrachloride, phosphorus trichloride, antimony trichloride, antimony pentachloride, bismuth trichloride, boron tribromide, aluminum tribromide, silicon tetrabromide, aluminum fluoride, molybdenum pentachloride, tungsten hexachloride, trityl hexachloroantimonate, or mixtures thereof.

In an aspect, the alkyl metal halide the metallic oligomerization catalyst further comprises a group 1, 2, 12, 13, or 14 metal. In an embodiment, the alkyl metal halide may be an alkyl aluminum halide, or an alkyl tin halide. In some embodiment, the alkyl aluminum halide may be an alkyl aluminum chloride; alternatively, an alkyl aluminum bromide; or alternatively, and alkyl aluminum iodide. In other embodiments, the alkyl tin halide may be an alkyl tin chloride; alternatively, an alkyl tin bromide; or alternatively, an alkyl tin iodide. In an embodiment, the alkyl metal halide may be an alkyl aluminum halide. In another embodiment, the alky metal halide may be an alkyl tin halide.

In an aspect the halide-containing compound may be an alkyl aluminum halide. In an embodiment the alkyl aluminum halide may be an alkyl aluminum chloride. Exemplary alkyl aluminum chlorides which may be utilized as the optional halide containing component of the oligomerization catalyst system include, but are not limited to, diethylaluminum chloride, diethylaluminum bromide, ethylaluminum dichloride, ethylaluminum sesquichloride, and mixtures thereof. In an embodiment, the alkyl aluminum chlorides which may be utilized as the optional halide-containing component of the oligomerization catalyst system may be diethyl aluminum chloride.

In an aspect, the organic halide may be a $C_1$ to $C_{15}$ organic halide; alternatively, a $C_1$ to $C_{10}$ organic halide; or alternatively, a $C_1$ to $C_8$ organic halide. In an embodiment, the organic halide may be selected from the group consisting of carbon tetrachloride, carbon tetrabromide, chloroform, bromoform, dichloromethane, dibromoethane, diiodomethane, bromomethane, iodomethane, dichloroethane, tetrachloroethane, trichloroacetone, hexachloroacetone, hexachlorocyclohexane, 1,3,5-trichlorobenzene, hexachlorobenzene, trityl chloride, benzyl chloride, benzyl bromide, benzyl iodide, chlorobenzene, bromobenzene, iodobenxene, hexafluorobenzene, or mixtures thereof.

Any aromatic compound may be used which can stabilize the catalyst system in the presence of heat. Generally, the aromatic compound may be a $C_6$ to $C_{50}$, a $C_6$ to $C_{30}$, a $C_6$ to $C_{18}$, or a $C_6$ to $C_{10}$, aromatic compound.

Generally, the amount of aromatic compound that may be used in the preparation of the oligomerization catalyst system may be up to about 15 weight percent, based on the amount of diluent in the reactor, between about 0.001 and about 10 weight percent, or between about 0.1 and about 5 weight percent, based on the volume of diluent in the reactor. Excess aromatic compound may inhibit catalyst system activity and insufficient aromatic compound may not act as a stabilizer to the catalyst system. Generally, the moles of aromatic compound per mole of active metal precursor (e.g. chromium compound) in the catalyst system may be up to about 6,000, between about 10 and about 3,000, or between about 20 to about 1,000 moles of aromatic compound per mole of active metal precursor (e.g. chromium) in the catalyst system.

Contacting of the aromatic compound and catalyst system may occur under any conditions sufficient to stabilize the catalyst system in the presence of heat. Generally, the temperatures for contacting may be between about −50° C. and about 70° C., between about 0° C. and about 70° C., or between about 5° C. and 30° C. Generally, contacting times may be less than about 5 hours, between about 0.01 seconds and about 4 hours, or between about 0.1 seconds and 3 hours. Longer contact times may not improve catalyst system stability, and shorter contact times may be insufficient to allow complete contacting of the aromatic compound and catalyst system and, therefore, insufficient to stabilize the catalyst system. Any pressure which allows thorough contacting of the aromatic compound and catalyst system may be used. Generally, any pressure which can maintain the aromatic compound and catalyst system in liquid form may be used. The contacting may be performed under a dry, inert atmosphere, so as to not alter the catalyst composition or system. Again for applicable examples of oligomerization catalyst systems, and their exemplary preparation and addition, see U.S. Pat. Nos. 6,133,495, 7,384,886, and 7,384,886. Other examples of metal precursors and oligomerization catalyst systems, and their exemplary preparation, may be found in the other documents attached as part of this disclosure.

Trimer Formation

Figure 7:
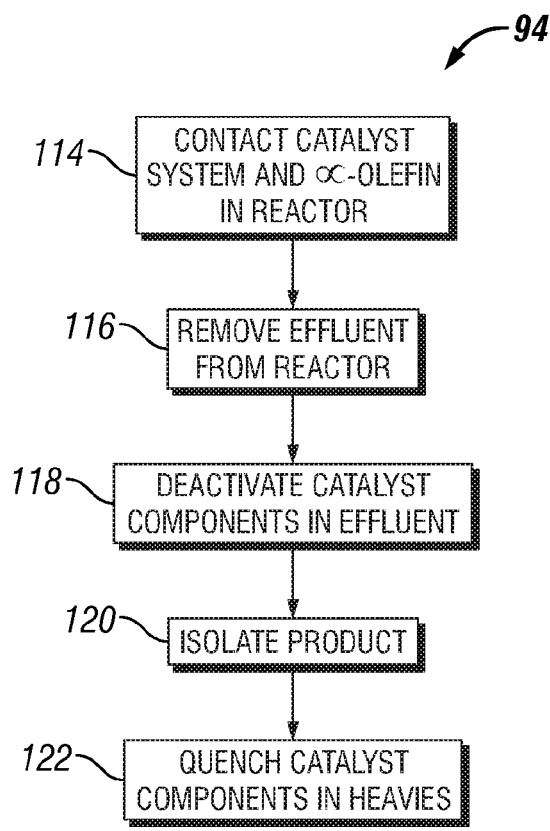
FIG. 7 is a block diagram of oligomerization method in accordance with embodiments of the present techniques.

Once the catalyst system is prepared, it may be used to form the oligomer (e.g., product alpha olefin, 1-hexene, 1-octene, etc.) by the exemplary method 94 depicted in FIG. 7. In the oligomerization method 94, a catalyst system is contacted with one or more alpha olefin (e.g., ethylene, butene, etc.) in a reactor (block 114). Other compounds, such as diluent, hydrogen, and so on, may be optionally added to the reactor. The catalyst system may be added as a complete catalyst system to the reactor, or components of the composition may be added separately to the reactor.

Moreover, the catalyst system formation may be continuous or intermittent, depending on the type of reactor. For example, if a loop reactor is used, a continuous catalyst system (or catalyst system components) addition may be maintained as a product stream is removed. In contrast, in a batch reactor, a single catalyst system (or catalyst system components) addition may be made. In a batch reactor, the catalyst may be contacted with the aromatic compound to increase the stability of the catalyst system in the reactor prior to the addition of any other reactants.

The oligomerization reaction may be performed in different types of reactors, including a solution reactor, a continuous stirred tank, a slurry reactor, a loop reactor, or a gas phase reactor, and so on. Furthermore, more than one reactor may be used, with the reactors being in sequence, in parallel, or in combinations thereof. In one embodiment, as discussed herein, a loop reactor may be used. In the loop reactor, the catalyst system and any insoluble reactants or products may be suspended by agitation in a circulated loop.

If employed, any number of aliphatic or aromatic diluents may be used as a diluent for the oligomerization reaction, including aliphatic or aromatic diluents. Generally, the diluent will be stable with respect to the oligomerization process, e.g., having no double bonds that may be reacted during the oligomerization. Accordingly, the oligomerization diluent may generally be a stable aliphatic compound. The oligomerization diluent may be a $C_4$ to $C_{24}$, a $C_4$ to $C_{15}$, a $C_4$ to $C_{10}$ aliphatic compound. Exemplary aliphatic compounds include but are not limited to isobutane, cyclohexane, and 1-hexene, among others. The choice of the oligomerization diluent may be made on the basis of convenience in processing. For example, isobutane may be chosen to be compatible with diluents used for the formation of polyolefins in a subsequent processing step. Since 1-hexene may be the reaction product of the oligomerization, it may be chosen as the oligomerization diluent to decrease the need for separation. Further, cyclohexane or methylcyclohexane may be chosen to solubilize the products made during the oligomerization. In an embodiment, the oligomerization diluent may be cyclohexane. Other diluents that may be available on site may also be used for the process.

The oligomer or product alpha olefin of the present techniques may be a trimer formed from three feed alpha olefins, i.e., the oligomerization described herein includes a trimerization. Olefins that may be used in the trimerization process may be self-reacted, i.e., trimerized, to give useful products. For example, the trimerization of ethylene may yield 1-hexene and the trimerization of 1,3-butadiene may yield 1,5-cyclooctadiene. Other olefinic compounds may be reacted with different olefinic compounds to give useful products. For example, the co-trimerization of ethylene and hexene which may result in 1-decene, 1-tetradecene, or a mixture thereof. In other examples, co-trimerization of ethylene and 1-butene may result in octenes, and co-trimerization of 1-decene and ethylene may result in tetradecenes, dodecenes, or a mixture of both. As noted herein, the number of double bonds in the combination of three ethylene units is reduced by two, to one double bond in 1-hexene. In another example, the number of olefin bonds in the combination of two 1,3-butadiene units is reduced by two, to two olefin bonds in 1,5-cyclooctadiene.

Olefinic compounds that may be used in a trimerization reaction may generally be $C_2$ to $C_{30}$, $C_2$ to $C_{16}$, or $C_2$ to $C_{10}$, olefinic compound. For example, mono-1-olefin compounds that may be used in the process include acyclic and cyclic olefins, such as ethylene, propylene, 1-butene, 2-butene, isobutylene, 1-pentene, 2-pentene, 1-hexene, 2-hexene, 3-hexene, 1-heptene, 2-heptene, 3-heptene, the four normal octenes, the four normal nonenes, and mixtures of any two or more thereof. Further, diolefin compounds may be used in the process, such as 1,3-butadiene, 1,4-pentadiene, and 1,5-hexadiene. In an embodiment, the olefinic compound may be ethylene.

The trimerization reaction may be performed at temperatures and pressure sat which the catalyst system can trimerize the olefin reactants. Generally, the reaction is performed at temperatures between about 0° C. and about 250° C., between about 60° C. and about 200° C., or between about 80° C. and about 150° C. If the reaction temperature is too low, the catalyst system may produce too much undesirable insoluble product, such as polymer. If the reaction temperature is too high, the catalyst or the reaction products may decompose.

The reaction may be performed at a pressure between about atmospheric and about 2500 psig, between about atmospheric and about 2000 psig, or between about 300 psig and about 1600 psig. Too low of a reaction pressure may result in low catalyst system activity. When the olefinic compound is ethylene, the reaction may be performed at an ethylene partial pressure ranging from 20 psi to 2500 psi; alternatively, from 100 psi to 2000; alternatively, from 200 psi to 1500 psi; or alternatively, from 300 psi to 1000 psi. Hydrogen may be added to the reactor to accelerate the reaction, increase catalyst system activity, and/or reduce polymer formation. When hydrogen is utilized, the hydrogen partial pressure may range from 2 psi to 100 psi; alternatively, 5 psi to 75 psi; or alternatively, 10 psi to 50 psi.

The products of the trimerization may then be removed from the reactor in an effluent stream, as indicated in block 116. As previously mentioned, a reactor effluent may be continuously removed from the reactor, while a continuous addition of diluent, catalyst system (or catalyst system components) and reactants will generally keep the amount of material in the reactor the same. Active catalyst system in the reactor effluent may be killed (deactivated) with a kill agent 14A, as indicated by reference numeral 118. Further, the effluent may be separated to isolate the oligomer or trimer product (block 120). Moreover, at least partially deactivated catalyst system within the systems that isolate the product may be quenched (remove reactivity with water, moisture or air) with the addition of a quench agent (block 122).

Trimerization Overview

Figure 8:
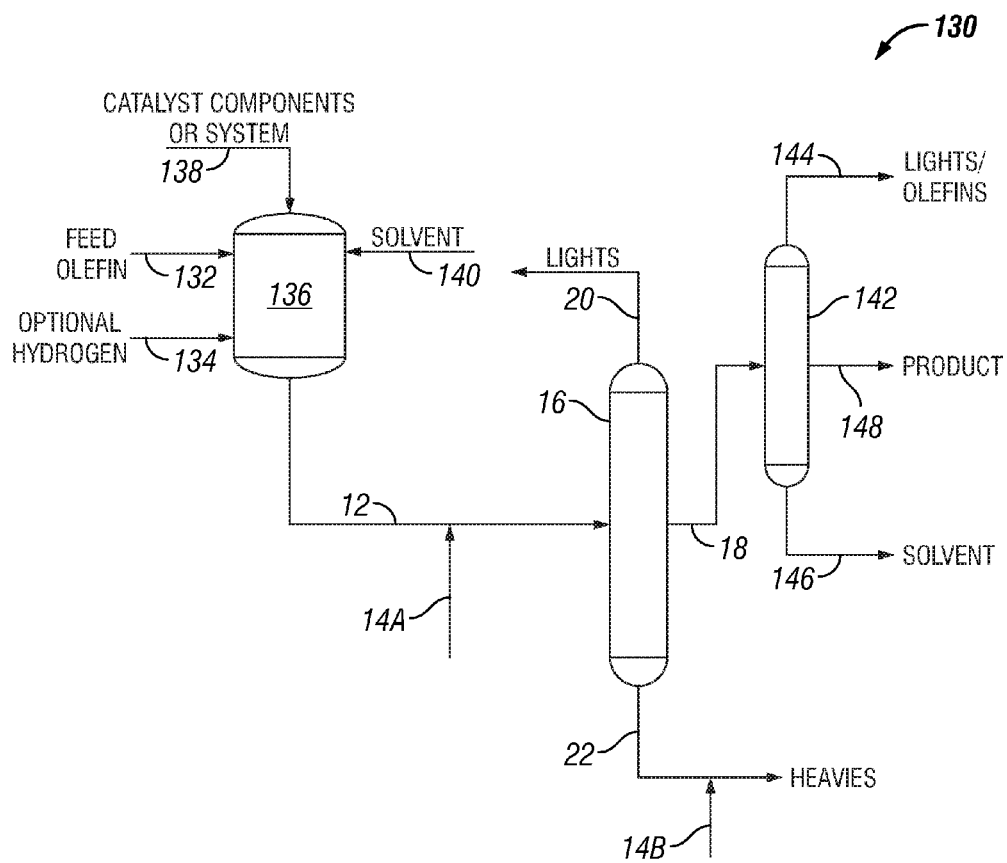
FIGS. 8-16 are flow diagrams of oligomerization systems in accordance with embodiments of the present techniques.

An oligomerization system 130 that may be used to implement the trimerization reaction process 94 discussed herein is illustrated in FIG. 8. The discussion with respect to FIGS. 8-16 that follows focuses on a process overview of the major components of the oligomerization systems. Routine process components, such as storage, mixing, pumps, heat exchangers, dryers, or valves are not discussed in detail.

In system 130 and related alternative systems discussed below, a feed olefin 132 and optionally hydrogen 134 are fed into trimerization reactor 136. A catalyst system or catalyst system components 138 and optionally diluent or solvent 140 is introduced to the reactor 136. The various feeds 132, 134, 138, and 140 may be located anywhere on trimerization reactor 136. However, the location of 132, 134, and 136 generally should be position to facilitate thorough contact of the olefin 132 with the catalyst system 138 in the reactor 136.

Trimerization reactor effluent 12 including trimerized product(s), reaction co-product(s), unreacted olefin, catalyst system, and other reactor components is removed from the reactor 136. A kill agent 14B may be introduced into the effluent 12 to kill or at least partially deactivate catalyst system in the effluent 12. Optionally, the effluent 12 may be filtered to remove particulates, such as, for example, catalyst system fines and undesirable polymeric products. Further, the effluent 12 may be optionally passed through a flash drum 32 or vapor/liquid separator (see FIG. 3) prior to introduction of effluent 12 into column 16.

Column 16 separates catalyst system and other heavies from lighter olefins and products. Heavy components 22 discharge from a bottom portion of the column 16 and may include the partially deactivated catalyst system and other materials such as heavy olefins. Light components 20 discharged from the column 16 and may include light olefins, which may be optionally recycled. Product/diluent 18 may discharge as a side draw from the column 16 and fed to a downstream column 142. In column 142, light products 144 are separated overhead and may be flared, recycled, or stored, for example. Diluent 146 may exit a bottom portion of column 142, and optionally recycled with optional treatment, such as being processed in a dryer (e.g., having adsorbent). Oligomer 148 (an oligomerization or trimerization product) may discharge from the column 142 via a side draw and recovered as desired product.

Figure 9:
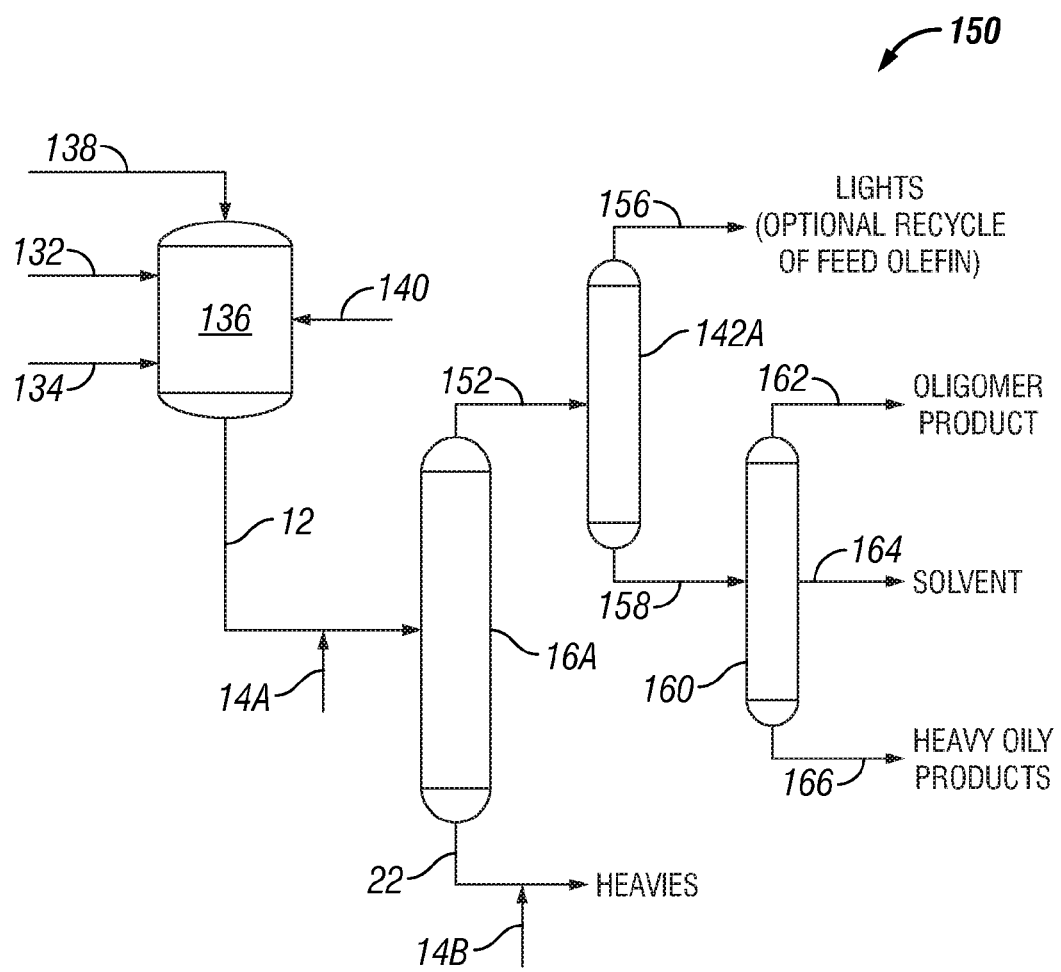

Referring to another embodiment, oligomerization system 50 of FIG. 9 depicts an alternative for the separation system. Column 16A is configured without a product side draw. Instead, the oligomerization/trimerization product discharges with light components in the overhead stream 152. Similarly, column 142A is configured without a product side draw, and column 154 is added. Lights stream 156 discharges overhead from column 142A. Bottoms stream 148 discharges from 142A is fed to column 160. Oligomerized product 162 is recovered overhead form column 160. Diluent 164 and heavy products 166 also discharge from column 160.

Figure 10:
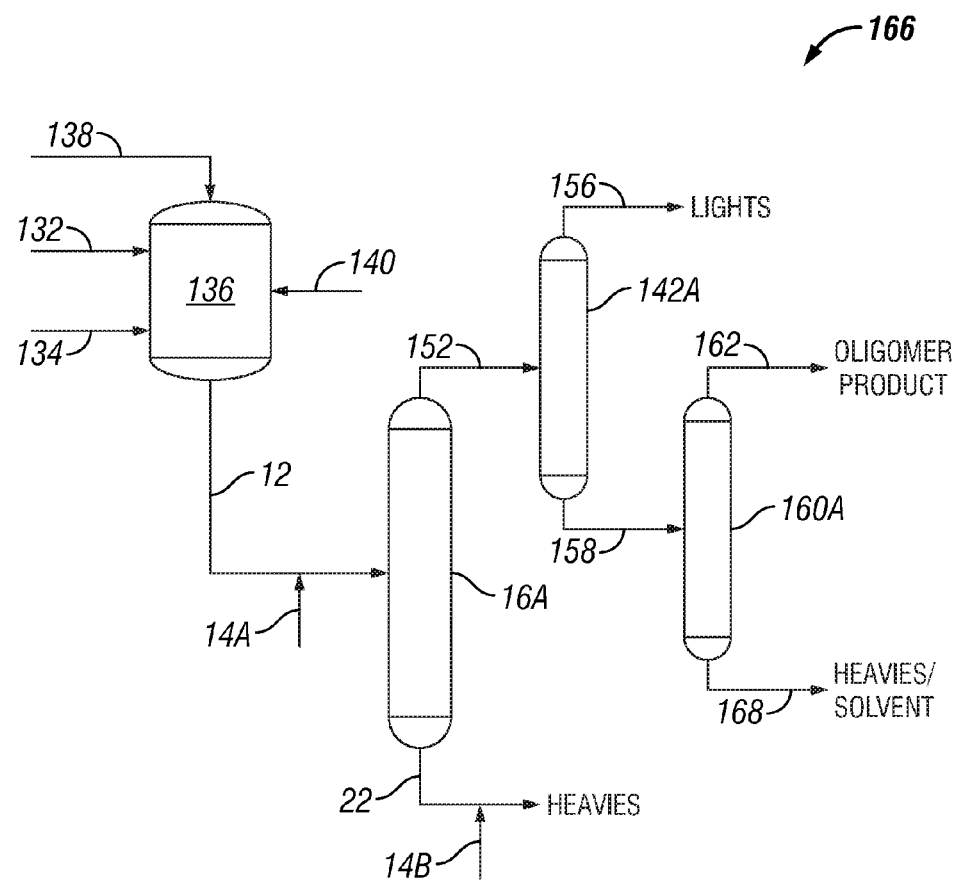
Figure 11:
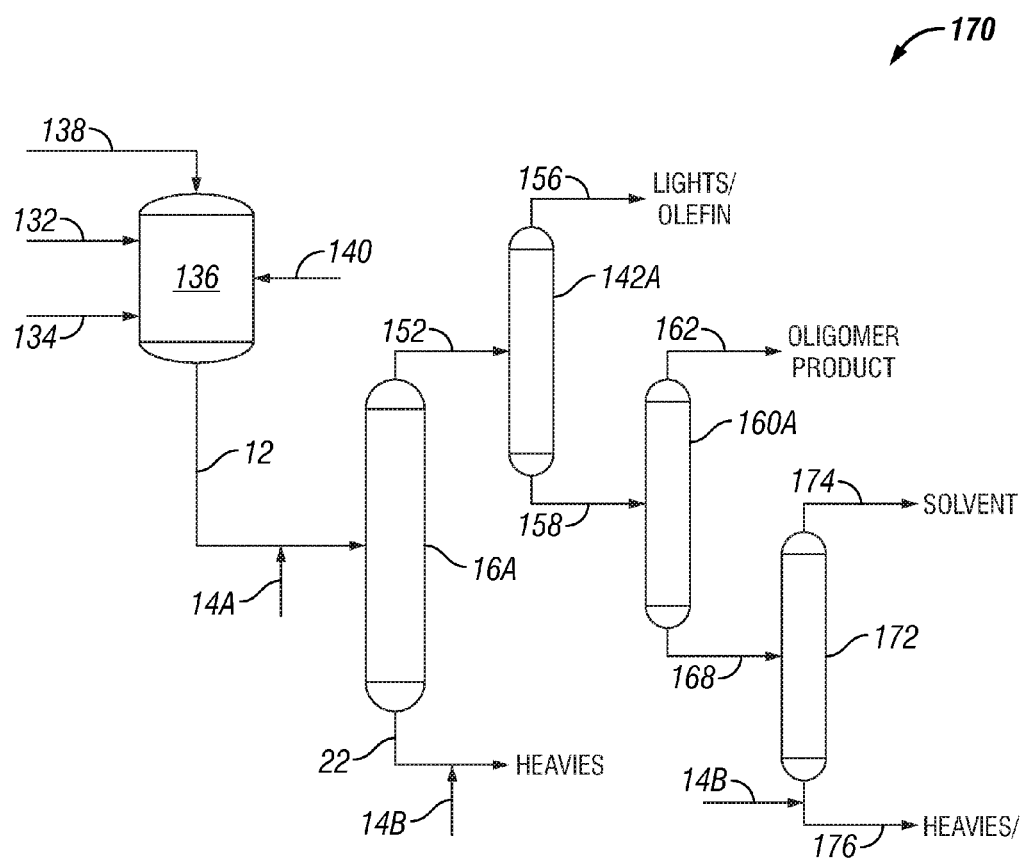

FIG. 10 depicts an oligomerization system 166 have an alternative for a fractionation or purification system. Column 160A is configured without a side draw, a diluent/heavies stream 168 discharge from a bottom portion of column 160A. As with the system 150 depicted in FIG. 9, oligomer product 162 is recovered overhead from column 160A. FIG. 11 depicts an oligomerization system 170 having an alternative for a separation system. The system 170 is configured as system 166 in FIG. 10, except column 172 is added. Diluent 174 and heavies 176 discharge in separate streams from column 172.

Figure 12:
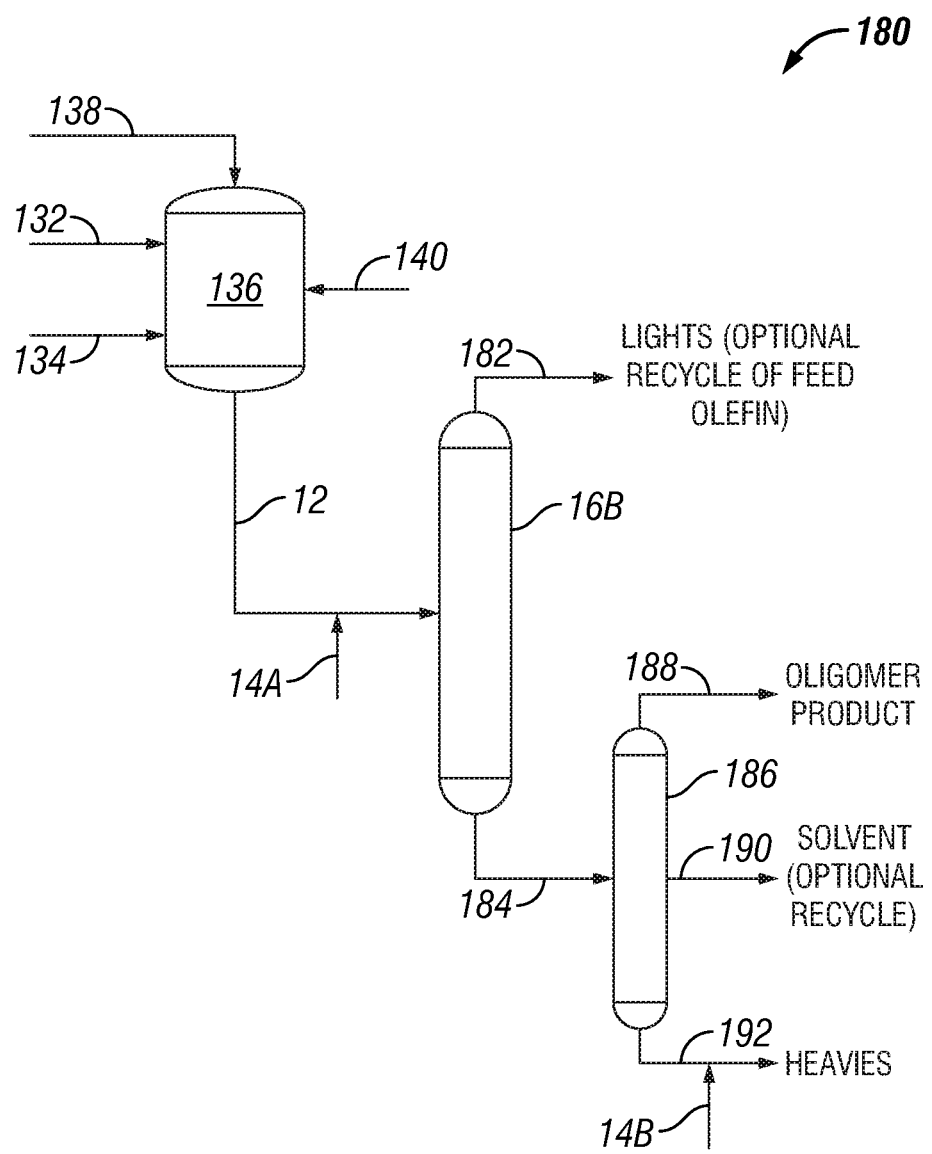
Figure 13:
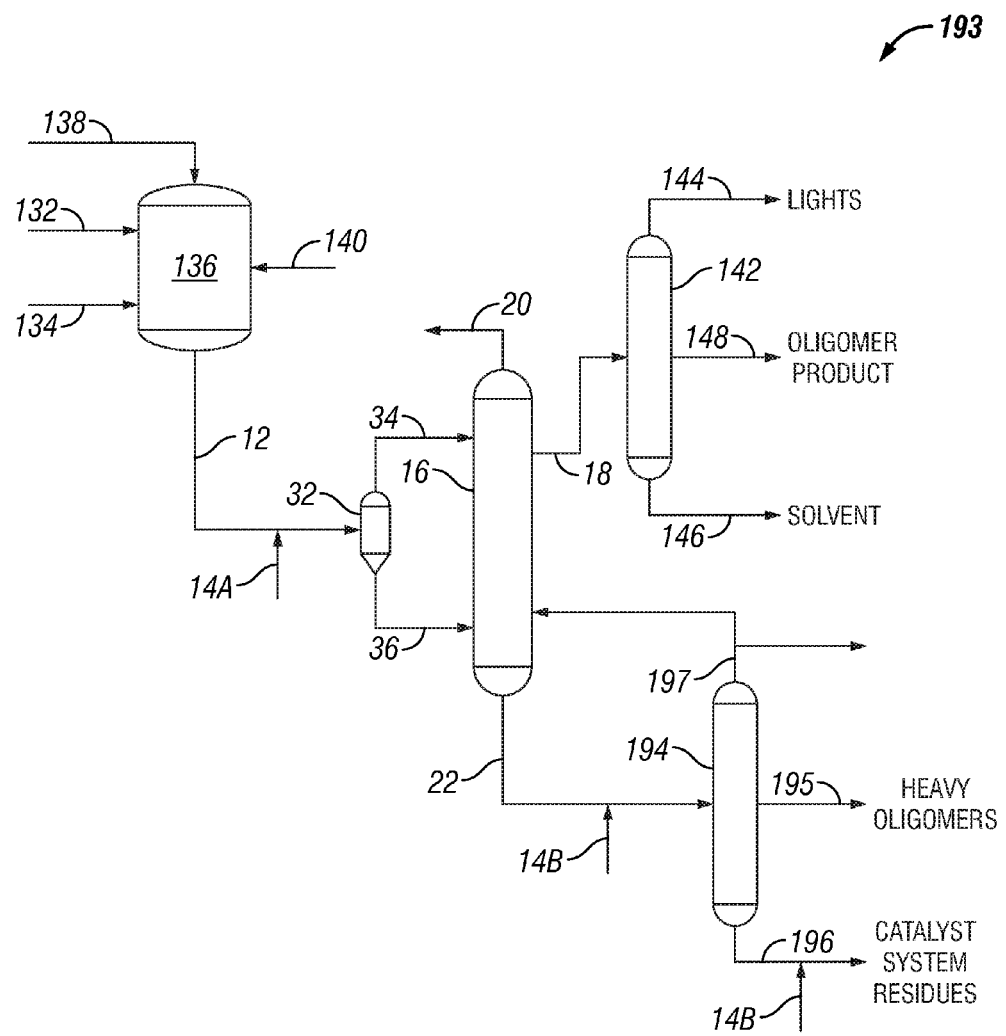
Figure 14:
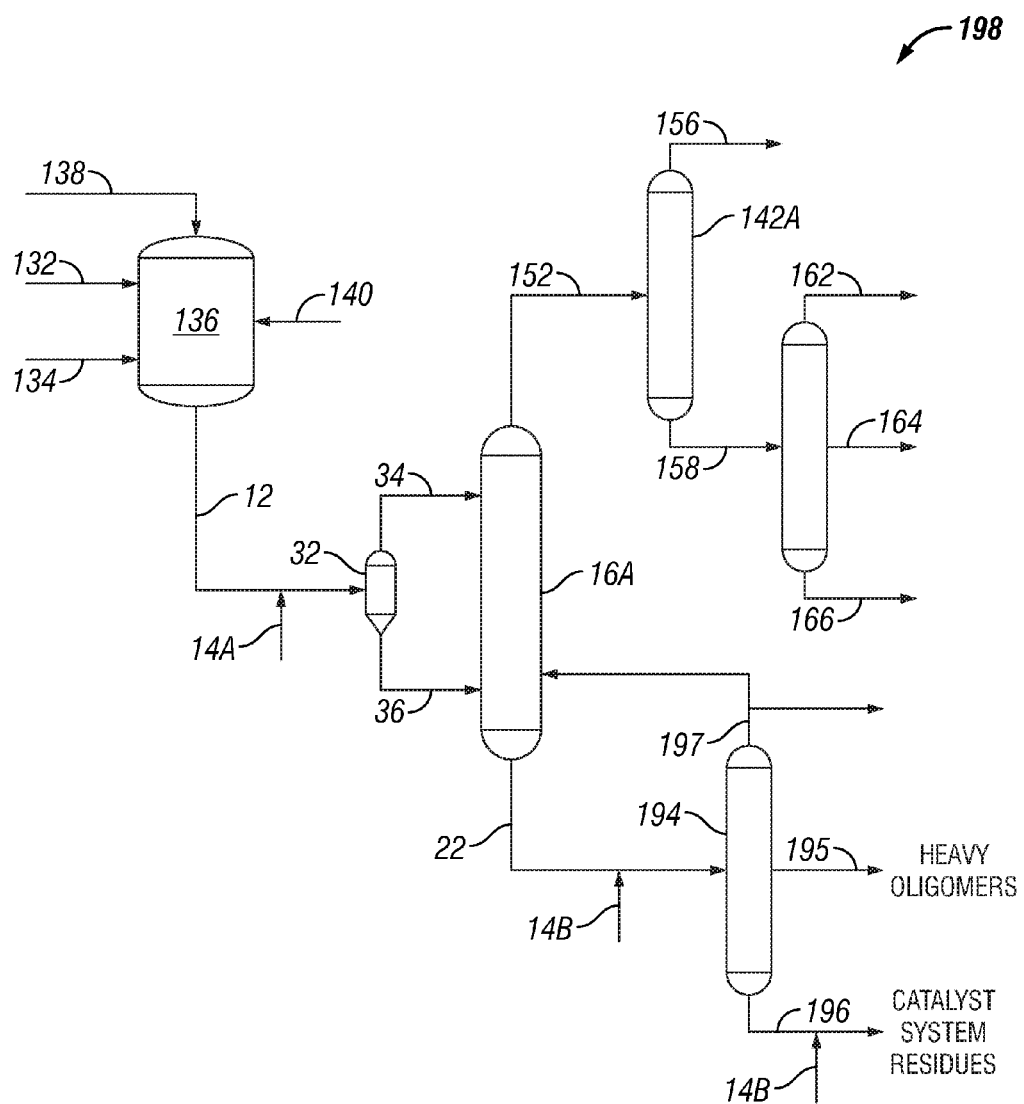
Figure 15:
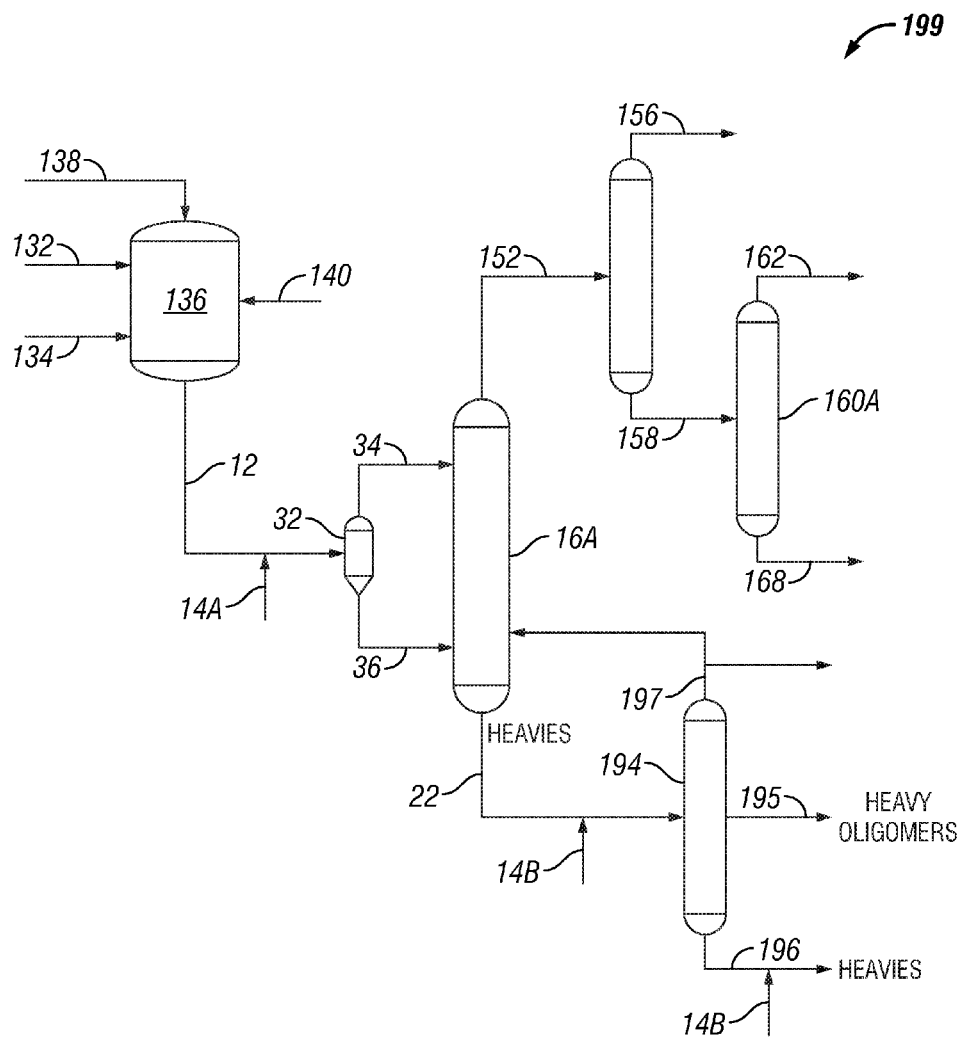
Figure 16:
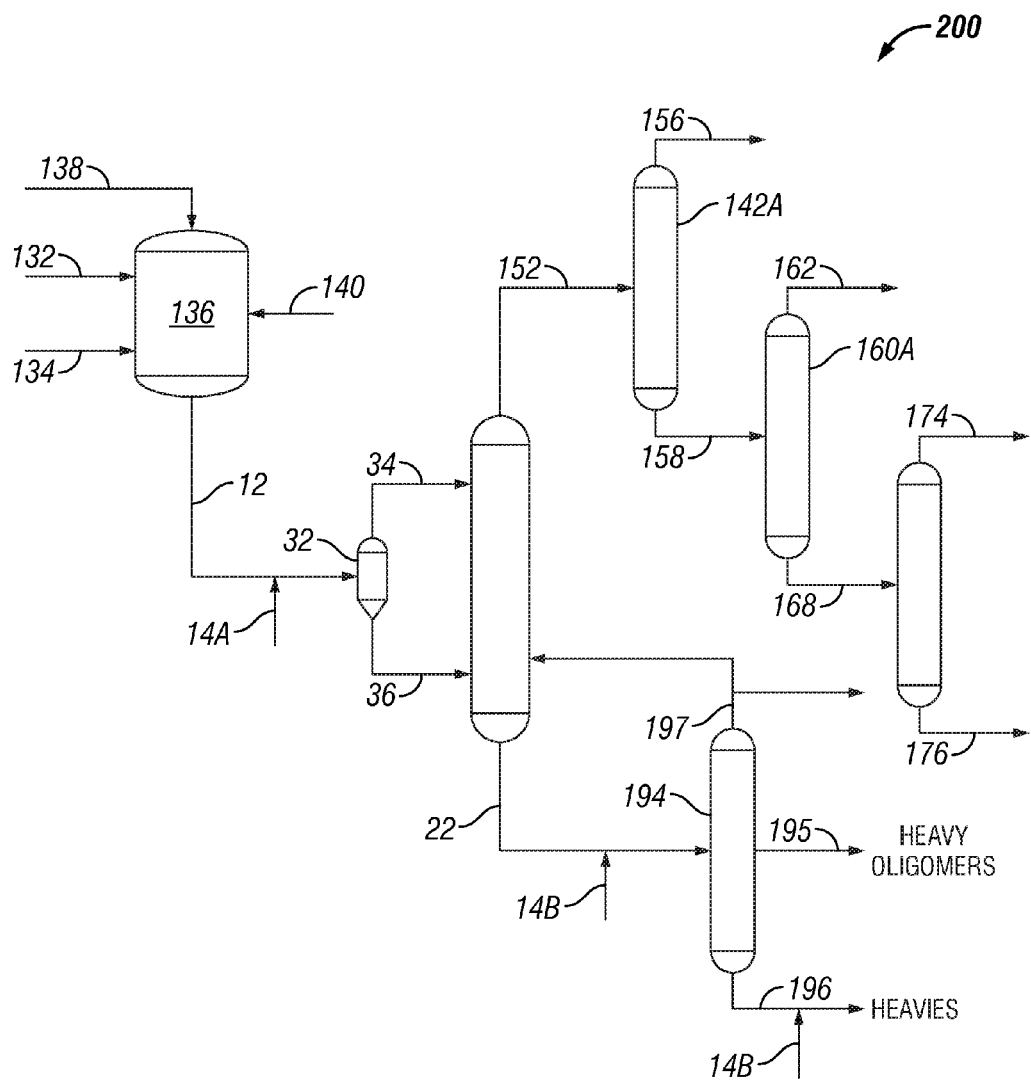

FIG. 12 depicts an oligomerization system 180 having an alternative purification system. Column 16B is configured such that light components 182 discharge overhead. Bottoms stream 184 is fed to column 186 where oligomer product 188 is recovered overhead, diluent 190 discharges as a side draw, and heavies 192 discharges in a bottom stream. In this example, quench agent 14B may be added or injected into heavies stream 192 or in downstream heavies storage, for example.

FIGS. 13-16 depict oligomerization systems 193, 198, 199, and 200, respectively, which incorporate optional processing of the effluent 12, including passing the effluent 12 through a flash drum 32 or vapor/liquid separator (see FIG. 3) prior to introduction of effluent 12 into column 16, 16A, and 16B. In addition, column 194 is optionally added to process the heavies stream 22. In column 194, catalyst systems residues 196 discharge as a bottom stream. Quench agent 14B may be added to stream 206. Heavy oilgomers 195 discharge as a side draw. Overhead stream 197 may be removed and/or returned to the upstream column 16, 16A, 16B. Lastly, it should be noted that the present techniques are not limited only to the embodiments specifically shown in the figures.

In certain embodiments, an olefin trimer production system includes a two-step method to kill and quench residual catalyst components, the system including: a trimerization reactor configured to generate an reactor effluent stream comprising an olefin trimer, a trimerization diluent, and a trimerization catalyst system; a kill injector configured to inject a kill solution comprising a kill agent into the reactor effluent stream from the trimerization reactor upstream of the fractionation column to substantially deactivate the trimerization catalyst system; a fractionation column configured to fractionate the reactor effluent stream from the trimerization reactor. The fractionation column is configured to discharge: a product stream comprising the olefin trimer and the trimerization diluent, and substantially no kill agent; an overhead vapor stream comprising components having a vapor pressure higher than the trimerization diluent; and a bottoms stream comprising components having a vapor pressure lower than the diluent, wherein the components having a vapor pressure lower than the diluent comprise a pyrophoric residue of the trimerization catalyst system. The timer production system also includes a quench injector configured to inject a quench solution comprising a quench agent into the bottoms stream from the fractionation column to substantially quench the pyrophoric residue.

In some embodiments, the olefin may be ethylene and the olefin trimer may include 1-hexene. In one example, the kill agent, the quench agent, or both, comprise an alcohol having greater than 4 carbons. In another example, the kill agent, the quench agent, or both, is 2-ethyl hexanol, decanol, octanol, heptanol, pentanol, butanol, or undecanol, or any combinations thereof.

The olefin trimer production system may include a decene column configured to fractionate the bottoms stream from the fractionation column, wherein the decene column is configured to discharge: a heavies stream comprising the catalyst system residue; a decene stream comprising a mixture of decenes; and a decene column stream containing material having a vapor pressure higher than decene. The olefin trimer production system may include a solvent splitter column configured to fractionate the product stream, wherein the solvent splitter column is configured to discharge: a diluent stream comprising the diluent; a product stream comprising the olefin; and a stream containing materials having a vapor pressure higher than the olefin.

Split Injection of Kill Agent and Quench Agent to Reduce Formation of Impurities in Product An experiment was performed to determine if the amount of kill solution added to the reactor effluent stream 12 could be decreased (e.g., split into two additions added at different process locations) without substantially increasing the amount of impurities formed in the process. The experiment simulated the components of the reactor effluent stream and the temperatures of the solution in the purification column to determine the purity of the trimer after processing by the purification column.

A simulated reactor effluent stream was prepared by mixing 100 mL cyclohexane, 100 mL of 1-octene, and 2 mL (5 mg Cr/mL solution) of a trimerization catalyst system solution (containing ethylbenzene, Cr(ethylhexanoate)$_3$, 2,5-dimethylpyrrole, triethylaluminum and diethylaluminum-chloride A 1-hexene oligomerization catalyst as prepared contains a molar ratio of TEA/DEAC/DMP/Cr=11:8:3:1. 2 mL of SiH catalyst contains 10 mg Cr (0.192 mmol Cr) and 3.84 mmol total metal atoms. For the reaction of 1 equivalent alcohol/equivalent metal atoms in catalyst, 0.61 mL (3.87 mmol) of n-octanol (dried over 5 Å molecular sieves, density=0.827 g/mL, MW=130.23) was added at room temperature to a solution containing 2 mL SiH catalyst, 100 mL 1-octene and 100 mL cyclohexane. This solution was charged into a 1 L batch reactor, pressured with H$_2$ gas (100 psig) and reated at 120° C. for 1 h. For 0.5 ROH/M, 0.30 mL n-octanol was added. The concentration of alcohol (ethylhexanol) shown in Table 1 was added to the solution and allowed to react with the catalyst system. This concentration is expressed in equivalents of alcohol per equivalent of metal atoms in the catalyst solution. The equivalent of alcohol is the number of moles of OH groups in the alcohol solution, and the equivalent of metal atoms is the sum of the number of moles of chromium and aluminum atoms in the solution.

TABLE 1

Alcohol Quenching Experiments

| Experiment | Amount of alcohol added (in Eqs alcohol./Eq. metal atoms in catalyst) | Purity of 1-octene versus total isomers (%) |
|---|---|---|
| 1 | BEFORE TREATMENT | 98.04 |
| 2 | 1.0 | 97.71 |
| 3 | 0.5 | 96.04 |
| 4 | 0 | 92.65 |

After the addition of the alcohol, the solution was heated in a batch reactor at 120° C. for 1 hr (with hydrogen gas pressurized to 100 psig) to simulate the process conditions in the purification column. An aliquot from the reaction mixture was then analyzed to determine the product purity, e.g., the proportion of the total olefinic isomers that consists of 1-octene. The results from these experiments indicate that adding about 1.0 eqs./eq. of alcohol to the reactor effluent stream upstream of the purification column may maintain sufficient purity of the trimer.

Polyolefin Production Overview

A use for the alpha olefin trimers discussed herein is in the production of polyolefins. In the production of polyolefin, the polymerization reactor, which polymerizes monomer into polyolefin, and the extruder, which converts the polyolefin into polyolefin pellets, are typically continuous. However, a variety of both continuous and batch systems may be employed throughout the polyolefin process. An exemplary nominal capacity for a typical polyolefin plant is about 900-1200 million pounds of polyolefin produced per year. Exemplary hourly design rates are approximately 85,000 to 150,000 pounds of polymerized polyolefin per hour, and 145,000 to 165,000 pounds of extruded polyolefin per hour. Future reactors may produce as much as 280,000 to 320,000 pounds of polymerized polyolefin per hour.

A benefit of larger reactors may be lower unit costs per unit mass, such as pounds, of polyolefin, not only for capital investment to construct the reactor, but also for fixed costs and operating costs to maintain and operate the loop reactor, and so on. However, to provide feedstocks, such as the trimer comonomer discussed herein, at a sufficient rate to maintain these production rates may be difficult. The techniques for producing catalyst disclosed herein may improve the efficiency and thus lower the cost of these processes.

A manufacturing system 202 that may be used for producing polyolefins, such as polyethylene copolymer or polypropylene copolymer, for example, using the trimers discussed herein, is depicted in the block diagram in FIG. 7. Various suppliers 204 may provide reactor feedstocks 206 to the manufacturing system 202 via pipelines, trucks, cylinders, drums, and so forth. The suppliers 204 may include off-site and/or on-site facilities, such as, for example, olefin plants, refineries, catalyst plants, and the like, and may include the trimerization reactor process 130 of the present disclosure. Examples of possible feedstocks 206 include olefin monomers (such as ethylene and propylene) and comonomers (such the trimers discussed herein), diluents (such as propane, isobutane, n-hexane, and n-heptane), chain transfer agents (such as hydrogen), catalysts (such as Ziegler catalysts, Ziegler-Natta catalysts, chromium catalysts, and metallocene catalysts), co-catalysts (such as triethylaluminum alkyl, triethylboron, and methyl aluminoxane), and other additives. In the case of ethylene monomer, exemplary ethylene feedstock may be supplied via pipeline at approximately 800-1450 pounds per square inch (psia) at 45-65° F. Exemplary hydrogen feedstock may also be supplied via pipeline, but at approximately 900-1000 psia at 90-110° F. Of course, a variety of supply conditions may exist for ethylene, hydrogen, and other feedstocks 206.

Feed System

The suppliers 204 typically provide feedstocks 206 to a reactor feed system 208, where the feedstocks 206 may be stored, such as in monomer storage and feed tanks, diluent vessels, catalyst tanks, co-catalyst cylinders and tanks, and so forth. In the feed system 206, the feedstocks 206 may be treated or processed prior to their introduction as feed 210 into the polymerization reactors. For example, feedstocks 206, such as monomer, comonomer, and diluent, may be sent through treatment beds (such as molecular sieves, alumina, etc.) to remove catalyst poisons. Such catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor being fed. Also, it should be noted that typically only a relatively small amount of fresh make-up diluent as feedstock 206 is utilized, with a majority of the diluent fed to the polymerization reactor recovered from the reactor effluent.

The feed system 208 may prepare or condition other feedstocks 206, such as catalysts, for addition to the polymerization reactors. For example, a catalyst may be activated and then mixed with diluent or mineral oil in catalyst preparation tanks for subsequent delivery to the polymerization reactor. Further, the feed system 208 typically provides for metering and controlling the addition rate of the feedstocks 206 into the polymerization reactor to maintain the desired reactor stability to achieve the desired polyolefin properties or production rate. For example, a flow meter may be used to measure the flow of ethylene to the reactor. Flow meters that may be used include orifice meters or mass flow meters (such as Coriolis meters available from MicroMotion, Inc. of Boulder, Colo.).

During operation, the feed system 208 may also store, treat, and meter recovered reactor effluent for recycle to the reactor. Indeed, operations in the feed system 208 generally receive both feedstock 206 and recovered reactor effluent streams. In total, the feedstocks 206 and recovered reactor effluent are processed in the feed system 208 and fed as feed streams 210 to the reactor system 212.

Reactor System

The reactor system 212 may include one or more reactor vessels, such as liquid-phase, loop slurry, or gas-phase reactors, or a combination of liquid and gas-phase reactors. If multiple reactors make up the reactor system 212, the reactors may be arranged in series, in parallel, or in any other suitable combination or configuration. If multiple reactors are used, the reactors may be operated at different conditions to make end products that are a combination of polymers from the different reactors and thus produce new or optimized end product properties. In the polymerization reactor vessels, one or more olefin monomers are polymerized to form a product including polymer particulates, typically called fluff or granules. The fluff may possess one or more melt, physical, rheological, and/or mechanical properties of interest, such as density, melt index (MI), melt flow rate (MFR), copolymer or comonomer content, modulus, and crystallinity. The reaction conditions, such as temperature, pressure, flow rate, mechanical agitation, product takeoff, component concentrations, polymer production rate, and so forth, may be selected to achieve the desired fluff properties.

In addition to the one or more olefin monomers, a catalyst that facilitates polymerization of the monomer is typically added to the reactor. The catalyst may be a particle suspended in the fluid medium within the reactor. In general, Ziegler catalysts, Ziegler-Natta catalysts, chrome-based catalysts, metallocenes, and other well-known polyolefin catalysts, as well as co-catalysts, may be used. An example of such a catalyst is a Ziegler catalyst containing tetravalent titanium on a silica support. Another example is a metallocene catalyst on a sulfated silica-alumina support.

Further, diluent may be fed into the reactor, typically a liquid-phase reactor. As previously mentioned, the diluent may be an inert hydrocarbon that is a liquid at reaction conditions, such as isobutane, propane, n-pentane, i-pentane, neopentane, n-hexane, cyclohexane, cyclopentane, methylcyclopentane, ethylcyclohexane, and the like. Again, a purpose of the diluent is generally to suspend the catalyst particles and polymer within the reactor (e.g., in the circulation of the polymer slurry in a loop reactor).

A motive device may be present within the reactor in the reactor system 212. For example, within a liquid-phase reactor, such as a loop slurry reactor, an impeller may create a turbulent mixing zone within the fluid medium. The impeller may be driven by a motor to propel the fluid medium as well as any catalyst, polyolefin fluff, or other solid particulates suspended within the fluid medium, through the closed loop of the reactor.

Diluent/Monomer Recovery, Treatment, and Recycle

The discharge 214 of the reactor system 212 may include the polymer fluff as well as non-polymer components, such as diluent, unreacted monomer and comonomer, and residual catalyst. The discharge 214 may be subsequently processed, such as by a diluent/monomer recovery system 216, to separate non-polymer components 218, such as diluent and unreacted monomer, from the polymer fluff 220. The diluent/monomer recovery system 216 may have a low-pressure recovery flash of the diluent/monomer with an associated recycle compression or may eliminate this process step using only a high pressure flash.

With or without the low pressure flash, the untreated recovered non-polymer components 218 may be further processed, such as by a fractionation system 222, to remove undesirable heavy and light components. Fractionated product streams 224 may then be returned to the reactor system 212 via the feed system 208. On the other hand, the non-polymer components 218 may be more directly recycled to the feed system 208 (as indicated by reference numeral 226), bypassing the fractionation system 222, and thus avoiding the energy consumption of the fractionation system 222. Indeed, in certain embodiments, up to 80-95% of the diluent discharged from the reactor bypasses the fractionation system in route to the polymerization reactor.

The polymer fluff 220 may be further processed within the diluent/monomer recovery system 216 and in an extrusion/loadout system 228 to prepare it for shipment, typically as pellets 230, to customers 232. Although not illustrated, polymer granules in the diluent/monomer recovery system 216, typically containing active residual catalyst, may be returned to the reactor system 212 for further polymerization, such as in a different type of reactor or under different reaction conditions. The polymerization and diluent recovery portions of the polyolefin manufacturing process 202 may be called the "wet" end 234 or "reaction" side of the process 202, and the extrusion/loadout 228 of the polyolefin process 202 may be called the "dry" end 236 or "finishing" side of the polyolefin process 202.

The polymer fluff 220 may be conveyed from the wet end 234 to the finishing side 236 by a blower or other electrical-mechanical force. Alternatively, the process pressure of the diluent/monomer recovery system 216 may be utilized to transport or convey the polymer fluff 220 from the wet end 234 to the finishing side 236. In this technique, the operation of the wet end 234 is more directly coupled to the finishing side 236. Such direct or "close" operative coupling may reduce the need for process residence time of the polymer fluff 220.

Extrusion/loadout System

In the extrusion/loadout system 228, the polymer fluff 220 is typically extruded to produce polymer pellets 230 with the desired mechanical, physical, and melt characteristics. Extruder feed may include additives, such as UV inhibitors, flow enhancers, and peroxides, among others, which are added to the polymer fluff 220 to impart desired characteristics to the extruded polymer pellets 230. An extruder/pelletizer receives the extruder feed, including one or more fluff products 220 and whatever additives have been added. The extruder/pelletizer heats and melts the extruder feed which then may be extruded through a pelletizer die under pressure to form polyolefin pellets. Such pellets are typically cooled in a water system disposed at or near the discharge of the pelletizer. The pellets may be conveyed from the pelletizer to the loadout area using a blower, or may be directly carried by the pellet cooling water to the loadout area.

In general, the polyolefin polymer pellets 230 may then be transported to a product load-out area where the pellets 230 may be stored, blended with other pellets, and/or loaded into railcars, trucks, bags, and so forth, for distribution to customers 232. In the case of polyethylene, pellets 230 shipped to customers 232 may include linear low density polyethylene (LLDPE), medium density polyethylene (MDPE), high density polyethylene (HDPE), and enhanced polyethylene. The various types and grades of polyethylene pellets 176 may be marketed, for example, under the brand names Marlex® polyethylene or MarFlex™ polyethylene of Chevron-Phillips Chemical Company, LP, of The Woodlands, Tex., USA.

Customers, Applications, and End-Uses

Polyolefin (e.g., polyethylene) pellets 230 may be used in the manufacturing of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys and an array of containers and plastic products. Further, it should be emphasized that polyolefins other than polyethylene, such as polypropylene, may form such components and products via the processes discussed herein.

Ultimately, the products and components formed from polyolefin (e.g., polyethylene) pellets 230 may be further processed and assembled for distribution and sale to the consumer. For example, a rotomolded sailboat may be outfitted for sale to a consumer, or a pipe line may be assembled and buried for natural gas distribution and sale. To form end-products or components, the pellets 230 are generally subjected to further processing, such as blow molding, injection molding, rotational molding, blown film, cast film, extrusion (e.g., sheet extrusion, pipe and corrugated extrusion, coating/lamination extrusion, etc.), and so on.

Blow molding is a process used for producing hollow plastic parts. The process typically employs blow molding equipment, such as reciprocating screw machines, accumulator head machines, and so on. The blow molding process may be tailored to meet the customer's needs, and to manufacture products ranging from the plastic milk bottles to the automotive fuel tanks mentioned herein. Similarly, in injection molding, products and components may be molded for a wide range of applications, including containers, food and chemical packaging, toys, automotive, crates, caps and closures, to name a few.

Extrusion processes may also be used. Polyethylene pipe, for example, may be extruded from polyethylene pellets and used in an assortment of applications due to its chemical resistance, relative ease of installation, durability and cost advantages, and the like. Indeed, plastic polyethylene piping has achieved significant use for water mains, gas distribution, storm and sanitary sewers, interior plumbing, electrical conduits, power and communications ducts, chilled water piping, and well casings, to name a few applications. In particular, high-density polyethylene (HDPE), which generally constitutes the largest volume of the polyolefin group of plastics used for pipe, is tough, abrasion-resistant and flexible (even at subfreezing temperatures). Furthermore, HDPE pipe may be made in size ranges from small diameter tubing up to pipe that is more than 8 feet in diameter. In general, polyethylene pellets may be supplied for the pressure piping markets, such as in natural gas distribution, and for the non-pressure piping markets, such as for conduit and corrugated piping.

Rotational molding is a high-temperature, low-pressure process used to form hollow parts through the application of heat to biaxially-rotated molds. Polyethylene resins generally applicable in this process are those resins that flow together in the absence of pressure when melted to form a bubble-free part, such as certain Marlex® HDPE and MDPE resins. Furthermore, the polyethylene resins suitable for rotational molding may exhibit desirable low-temperature impact strength, good load-bearing properties, and good ultraviolet (UV) stability. Accordingly, applications for rotationally-molded Marlex® resins include agricultural tanks, industrial chemical tanks, potable water storage tanks, industrial waste containers, recreational equipment, marine products, plus many more.

Sheet extrusion is a technique for making flat plastic sheets from a variety of polyethylene resins (pellets 230). The relatively thin gauge sheets are generally thermoformed into packaging applications such as drink cups, deli containers, produce trays, baby wipe containers and margarine tubs. Other markets for sheet extrusion of polyolefin include those that utilize relatively thicker sheets for industrial and recreational applications, such as truck bed liners, pallets, automotive dunnage, playground equipment, and boats. A third use for extruded sheet, for example, is in geomembranes, where flat-sheet polyethylene material is welded into large containment systems for mining applications and municipal waste disposal.

The blown film process is a relatively diverse conversion system used for polyethylene. The American Society for Testing and Materials (ASTM) defines films as less than 0.254 millimeter (10 mils) in thickness. However, the blown film process can produce materials as thick as 0.5 millimeter (20 mils), and higher. Furthermore, blow molding may be used in conjunction with monolayer and/or multilayer coextrusion technologies for producing numerous products, such as labeled bottles. Advantageous properties of the products produced by the blown film process may include clarity, strength, tearability, optical properties, and toughness, to name a few.

The cast film process may differ from the blown film process through the fast quench and virtual unidirectional orientation capabilities. These characteristics allow a cast film line, for example, to operate at higher production rates while producing beneficial optics. Applications in food and retail packaging take advantage of these strengths. Finally, polyolefin pellets may also be supplied for the extrusion coating and lamination industry.

Using either type of film extrusion, linear low density polyethylene, for example, may be extruded from polyethylene resin pellets and used in an assortment of applications due to its flexibility, chemical resistance, durability, processability, cost advantages, and the like. Such applications may include stretch films for palletizing materials, packaging for fresh cut fruits and vegetables, shrink wrap, and other product packaging. Films made from linear low density polyethylene have achieved significant success in unusual applications, such as geomembranes. A geomembrane may be used to isolate a storage pit, such as for a dump or sewer overflow pit, from the surrounding ground, and thus protect groundwater from contamination. Other applications may include garment bags, bakery films, industrial liners, and the like.

Other Feed Streams

Recycle diluent (e.g., propane or isobutane) with entrained monomer may be returned from the diluent/monomer recovery system 216 (e.g., corresponding to stream 218 of FIG. 7) and sent to the polymerization reactor. The amount of entrained monomer may vary, depending on the polymerization efficiency. For example, the relatively low incorporation efficiency of 1-hexene from the trimerization of ethylene may increase the amount entrained in the recycle diluent stream. In the example of "direct" recycle to the reactor, the recycled diluent may be cooled and passed through a heavies' knockout pot, where heavy components are removed out of a bottom discharge and sent via a centrifugal pump, for example, as feed to the fractionation system 222. The overhead of the knockout pot may be further cooled in a heat exchanger and collected in a recycle diluent surge tank for feed to the reactor. Downstream, a centrifugal pump may deliver the diluent through recycle diluent treaters to a loop slurry reactor. It should be noted that a relatively small amount of fresh diluent (not illustrated) may be added in the fractionation system 222, for example, to make-up for diluent losses in the manufacturing process 202. Furthermore, comonomer (e.g., 1-hexene) from the trimerization process 130 may be added at various points in the recycle diluent circuit for addition to the reactor.

While the techniques disclosed herein may be susceptible to various modifications and alternative forms, specific embodiments have been shown by way of example in the drawings. However, it should be understood that the techniques are not intended to be limited to the particular forms disclosed. Rather, the techniques encompass all modifications, equivalents and alternatives falling within the spirit and scope of the techniques as defined by the following appended claims.

What is claimed is:

1. A method comprising:
   a) contacting a reactor effluent comprising a catalyst system comprising a chromium compound, an oligomerized olefin, and diluent with a kill agent to at least partially deactivate the catalyst system, wherein the oligomerized olefin comprises at least 70 weight percent trimer;
   b) separating the reactor effluent into
      i) one or more first streams comprising oligomerized olefin, diluent, or combinations thereof, the one or more first streams being substantially devoid of the at least partially deactivated catalyst, and
      ii) a second stream comprising the deactivated catalyst; and
   c) contacting the second stream with a quench agent, wherein the quench agent comprises a compound selected from the group consisting of an amine, an alcohol, and any combination thereof.

2. The method of claim 1, wherein the one or more first streams is substantially devoid of kill agent.

3. The method of claim 1, further comprising recycling the diluent.

4. The method of claim 1, wherein the step of contacting the reactor effluent with the kill agent produces the at least partially deactivated catalyst system having a reduced catalytic activity.

5. The method of claim 1, wherein the step of contacting the reactor effluent with the kill agent produces the at least partially deactivated catalyst system having a reduced activity for isomerizing the oligomerized olefin.

6. The method of claim 5, wherein the step of separation occurs by one or more distillations.

7. The method of claim 1, wherein the oligomerized olefin has an isomerized olefin content less than that of the oligomerized olefin produced when compared to a method which does not at least partially deactivate the catalyst system.

8. The method of claim 7, wherein the oligomerized olefin has an isomerized olefin content that is increased by no more than 75 percent by weight of the increased isomerized olefin when not at least partially deactivating the catalyst system.

9. The method of claim 1, wherein the catalyst system comprises the chromium compound and a metal alkyl.

10. The method of claim 1, wherein the kill agent is contacted in an equivalent ratio of kill agent to metal atoms in the catalyst system ranging from 0.75:1 to 1.25:1.

11. The method of claim 1, wherein the kill agent is contacted in an equivalent ratio of kill agent to metal atoms in the catalyst system ranging from 0.9:1 to 1.2:1.

12. The method of claim 1, wherein the kill agent is contacted in an equivalent ratio of kill agent to metal atoms in the catalyst system at about 1:1.

13. The method of claim 1, wherein the kill agent is selected from a $C_4$ to $C_{30}$ alcohol.

14. The method of claim 1, wherein the amount of quench agent is sufficient to render the second stream non-pyrophoric.

15. A method comprising:
a) contacting a catalyst system comprising a chromium compound, ethylene, and a diluent;
b) producing a trimerization product comprising 1-hexene in a reactor;
c) removing a reactor effluent comprising the catalyst system, ethylene, the trimerization product, and diluent, from the reactor, wherein the trimerization product comprises at least 70 weight percent trimer;
d) contacting the reactor effluent with a kill agent to at least partially deactivate the catalyst system;
e) distilling the reactor effluent into
  i) one or more first streams comprising ethylene, 1-hexene, diluent, or any combination thereof, the one or more streams being substantially devoid of deactivated catalyst, and
  ii) a second stream comprising the deactivated catalyst system; and
f) contacting the second stream with a quench agent, wherein the quench agent comprises a compound selected from the group consisting of an amine, an alcohol, and any combination thereof.

16. The method of claim 15, wherein distilling includes one or more distilling steps.

17. The method of claim 15, wherein the one of more first stream is substantially devoid of first kill agent as it exits the distilling step.

18. The method of claim 15, wherein the step of contacting the reactor effluent with the kill agent produces the at least partially deactivated catalyst system having a reduced catalytic activity.

19. The method of claim 15, wherein the step of contacting of the reactor effluent with the kill agent produces the at least partially deactivated catalyst system having a reduced activity for isomerizing 1-hexene.

20. The method of claim 15, wherein the catalyst system comprises the chromium compound and a metal alkyl.

21. The method of claim 15, wherein the kill agent is contacted in an equivalent ratio of kill agent to metal atoms in the catalyst system ranging from 0.75:1 to 1.25:1.

22. The method of claim 15, wherein the kill agent is contacted in an equivalent ratio of kill agent to metal atoms in the catalyst system ranging from 0.9:1 to 1.2:1.

23. The method of claim 15, wherein the kill agent is contacted in an equivalent ratio of kill agent to metal atoms in the catalyst system at about 1:1.

24. The method of claim 15, further comprising recycling the diluent.

25. The method of claim 15, wherein the amount of quench agent is sufficient to render the second stream non-pyrophoric.

26. The method of claim 1, wherein the olefin comprises ethylene and the trimer comprises 1-hexene.

* * * * *